US012531793B2

(12) United States Patent
Mishra et al.

(10) Patent No.: US 12,531,793 B2
(45) Date of Patent: Jan. 20, 2026

(54) SYSTEMS AND METHODS RELATED TO GENERATING TICKETS FOR A COMPUTER NETWORK

(71) Applicant: Rakuten Mobile, Inc., Tokyo (JP)

(72) Inventors: Abhishek Kumar Mishra, Madhya Pradesh (IN); Palak Bajaj, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 504 days.

(21) Appl. No.: 17/777,277

(22) PCT Filed: Apr. 1, 2022

(86) PCT No.: PCT/US2022/022985

§ 371 (c)(1),
(2) Date: May 17, 2022

(87) PCT Pub. No.: WO2023/191805

PCT Pub. Date: Oct. 5, 2023

(65) Prior Publication Data

US 2024/0171476 A1 May 23, 2024

(51) Int. Cl.

| | |
|---|---|
| ***H04L 41/5074*** | (2022.01) |
| ***G06F 3/04817*** | (2022.01) |
| ***G06F 3/0482*** | (2013.01) |
| ***H04L 41/22*** | (2022.01) |

(52) U.S. Cl.
CPC ...... *H04L 41/5074* (2013.01); *G06F 3/04817* (2013.01); *G06F 3/0482* (2013.01); *H04L 41/22* (2013.01)

(58) Field of Classification Search
CPC . H04L 41/5074; H04L 41/22; G06F 3/04817; G06F 3/0482
See application file for complete search history.

(56) References Cited

U.S. PATENT DOCUMENTS

| | | | | |
|---|---|---|---|---|
| 7,469,287 | B1 | 12/2008 | Castillo et al. | |
| 7,818,631 | B1 | 10/2010 | Halikhedkar et al. | |
| 2018/0204167 | A1* | 7/2018 | Rayner | G06F 3/04817 |
| 2020/0065151 | A1* | 2/2020 | Ghosh | G06F 40/295 |
| 2020/0106670 | A1* | 4/2020 | Mishra | H04L 41/22 |

* cited by examiner

*Primary Examiner* — Asher D Kells
(74) *Attorney, Agent, or Firm* — HAUPTMAN HAM, LLP

(57) ABSTRACT

Systems and methods of setting rules that automate the creation of a ticket related to incidents on a computer network. In some embodiments, a graphical user interface (GUI) is presented, wherein the GUI includes one or more first graphical items for defining a network incident type on a network. One or more user selections of the one or more first graphical items are received. One or more automated incident identification characteristics of an incident management data structure are generated based on the user selections of the first graphical items. User input is received in the GUI that defines one or more automated ticket generation rules of the incident management data structure.

20 Claims, 19 Drawing Sheets

SYSTEMS AND METHODS RELATED TO GENERATING TICKETS FOR A COMPUTER NETWORK

RELATED APPLICATIONS

The present application is a National Phase of International Application No. PCT/US2022/022985, filed Apr. 1, 2022.

FIELD OF THE DISCLOSURE

This disclosure relates generally to systems and methods of handling network incidents on a computer network.

BACKGROUND

A telecommunication network system includes network devices (such as switch, router, etc.) and other types of hardware. Some of this hardware implements software to perform network functions. In some cases, problems occur in the network and tickets are generated so that the responsible personnel can fix the problem. Managing changes in network systems is complex and challenging due to the amount of coordination and communications performed between different parties.

SUMMARY

Systems and methods of automatically generating tickets for incidents on a computer network are disclosed. In some embodiments, method of setting rules for automating creation of a ticket related to incidents on a computer network is disclosed. The method includes presenting a graphical user interface (GUI), wherein the GUI includes one or more first graphical items for defining a network incident type on a network. One or more user selections are received of the one or more first graphical items. One or more automated incident identification characteristics of an incident management data structure are generated based on the user selections of the first graphical items. Furthermore, a user input is received in the GUI that defines one or more automated ticket generation rules of the incident management data structure. In this manner, automated rules for automatically identifying network incidents and generating tickets based on the network incidents created by a user through a GUI.

Systems and methods of automatically identifying network incidents on a computer network and for generating tickets as a result of those incidents are also disclosed. In some embodiments, incident management data structures are stored (e.g., in a database). Each of the incident management data structures includes one or more defined incident identification characteristics and one or more automated ticket generation rules. In response to a network incident, a network incident data structure is received that describes a network incident on a network. A target incident management data structure is selected from the incident management data structures based on the defined automated incident identification characteristics of the target incident management data structure matching the network incident described by the network incident data structure. A ticket incident data structure is generated in accordance with the one or more automated ticket generation rules of the target incident management data structure. In this manner, tickets are automatically generated upon detection of network incidents on the network.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
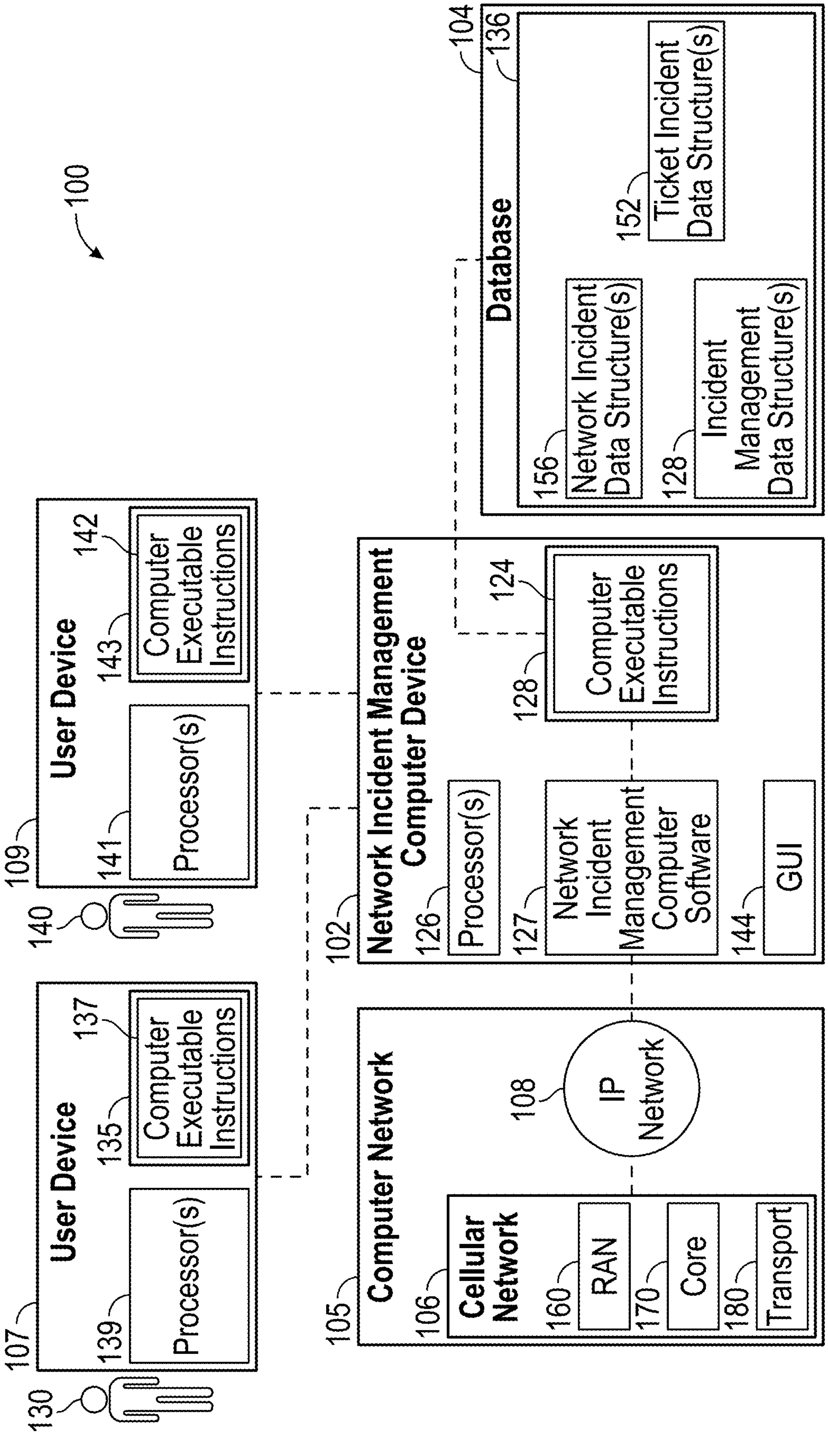
FIG. 1 is a block diagram of a computing system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

(Optional, use when applicable) Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems and methods of automatically generating tickets for incidents on a computer network are disclosed. In addition, systems and methods for setting up automated characteristics and automated rules that generate the tickets are disclosed. In some embodiments, user selections and user input is received to define the automated incident identification characteristics and automated ticket generation rules. In this manner, different network incidents correspond to different ones of the network incident managements structures. In response to the automated incident identification characteristics matching a description of an incident, automated ticket generation rules are implemented to automatically generate a ticket.

FIG. 1 is a block diagram of a computing system 100, in accordance with some embodiments.

The computing system 100 includes a network incident management computer device 102, at least one database 104, a computer network 105, and user devices 107, 109. In FIG. 1, the computer network 105 includes a cellular network 106 and an internet protocol (IP) network 108. In some embodiments, the computer network 105 includes only an IP network 108. In some embodiments, the computer network 105 includes only the cellular network 106. In some embodiments, the computer network 105 includes multiple IP networks, like the IP network 108. In some embodiments, the computer network 105 includes multiple cellular networks, like the cellular network 106.

In some embodiments, the network incident management computer device 102 and the cellular network 106 are connected to each other through the IP network 108. In some embodiments, the IP network 108 includes a wide area network (WAN) (i.e., the internet), a local area network (LAN), a wide area local area network (WLAN), and/or the like. In some embodiments, the cellular network 106 includes a wireless WAN (WWAN).

The cellular network 106 includes a radio access network (RAN) 160. The RAN 160 is the radio element of the cellular network 106. The RAN 160 includes network elements such as base stations that include one or more radio transceivers. The base stations cover land areas called cells. User equipment, such as cell phones, smartphones, laptops, etc., connect to each of the base stations that cover the cells. RAN 160 connects to the core 170 through back haul links, which are provided by the transport 180.

The core 170 is a central part of the overall cellular network 106. The core 170 allows mobile subscribers to get access to the services (e.g. international calling, text messaging, local cellular calls). In some embodiments, the core 170 is responsible for critical functions such as maintaining subscriber profile information, subscriber location, authentication of services, and the necessary switching functions for voice and data sessions. The core 170 includes network elements. In some embodiments, the network elements include a Mobility Management Entity (MME), a Serving Gateway, a Multimedia Broadcast Multicast Service (MBMS) Gateway, a Broadcast Multicast Service Center (BM-SC), and a Packet Data Network (PDN) Gateway. In some embodiments, the MME is in communication with a Home Subscriber Server (HSS). The MME is the control node that processes the signaling between the user equipment and the core 170. Generally, the MME provides bearer and connection management. In some embodiments, Internet protocol (IP) packets are transferred through a serving gateway, which itself is connected to the IP network 108.

The transport 180 refers to the transport network that connects the core 170 and the RAN 160 of the cellular network 106. The transport 180 includes network elements 182 such as backhaul links, connectors, relays, Voice over IP devices, etc. In some embodiments, the transport 180 includes a fronthaul that connects macrocell to the small cells, radio units, digital units and/or the like.

The network incident management computer device 102 (server 102 in some embodiments) is a computer device that includes at least one processor 126 and a non-transitory computer readable medium 128. The non-transitory computer readable medium 128 stores computer executable instructions 124. In some embodiments, non-transitory computer readable medium 128 include a random-access memory (RAM), a read-only memory (ROM), an electrically erasable programmable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. When the processor 126 executes the computer executable instructions 124, the processor 126 executes the network incident management computer software 127.

The network incident management computer software 127 is configured to automate the handling of network incidents on the computer network 105. In some embodiments, network incident relate to malfunctions or errors that occur in hardware of the computer network 105. In some embodiments, network incidents relate to bugs and errors that occur in software of the computer network 105. In some embodiments, network incidents relate to malfunctions, errors, bugs, and other failures of operation in both hardware and software of the computer network 105. In some embodiments, the hardware of network 105 comprises server, base station, radio unit, and/or any other suitable hardware in a network system, and the software of network 105 comprises a plurality of applications performing telecommunication functions, managing the telecommunication performance, and/or any other suitable software in a network system. In some embodiments, the network incident management computer software 127 is configured to automate the incident management of a network incident so that the appropriate procedures are applied to correct the network incident in the computer network 105.

In some embodiments, the network incident management computer device 102 is a server. In some embodiments, the network incident management computer device 102 is configured to implement other software besides the network incident management computer software 127. In some embodiments, the network incident management computer device 102 is a dedicated computer device that is configured to only implement the network incident management computer software 127.

The network incident management computer software 127 implemented by the network incident management computer device 102 is configured to monitor the computer network 105 to detect when a network incident occurs on the computer network 105. In some embodiments, any kind of failure that occurs in any service or device is a network incident that results in the generation of a ticket. For an example, if connectivity between two devices fails, then the failure in the connectivity between the devices impacts associated services or network devices and that failure can is treated as a network incident that results in the generation of a ticket. Other examples of network incidents that result in the generation of a ticket include high temperatures in one or more network devices, power failures in network devices, battery down in network devices, and/or the like. In some embodiments, the network incident management computer software 127 implements an automated script (e.g., a crawler) that is configured to detect network incidents that occur on the computer network 105. In some embodiments, the network script is the input in response to network events/alarms. In some embodiments, the network script correlates a set of algorithms using set of rules that users define in different correlation configurations. Each algorithm is implemented sequentially to reduce the events/alarm count after each algorithm to avoid duplicate incident creation on same network events and/or alarms. In response to detecting a network incident on the computer network 105, the network incident management computer software 127 is configured to generate a network incident data structure 156 that describes the network incident on the computer network 105. In some embodiments, the network incident data structure 156 describes the network domain in which the incident occurred. In some embodiments, the network incident data structure 156 describes an IP address or a LAN in the IP Network 108 where the network incident occurred. In some embodiments, the network incident data structure 156 identifies the location where the network incident occurred in the RAN 160, Core 170 or the Transport 180 of the cellular network 106. In some embodiments, the network incident data structure 156 describes and provides a network location of a particular piece of equipment in which the network incident occurred. In some embodiments, the network incident data structure 156 describes a geographical location of the network equipment where the network incident occurred. In some embodiments, the network incident data structure 156 identifies a vendor that provides services related to the network incident. In some embodiments, the network incident data structure 156 identifies a correlation type related to the network incident. In some embodiments, the network incident data structure 156 identifies a category of the network incident. In some embodiments, the network incident data structure 156 identifies a cause code of the network incident. In some embodiments, the network incident data structure 156 includes error codes, error messages, alarm codes, warning codes, event data, event times, and/or the like related to the network incident.

The network incident management computer software 127 stores the network incident data structures 156 in the database 113. The network incident management computer software 127 also stores incident management data structures 154. Each of the incident management data structures 154 includes one or more defined incident identification characteristics and one or more automated ticket generation rules. The incident identification characteristics are used to match the incident management data structures 154 to network incident data structures 156. For example, if a particular type of network incident occurs because of a software error in the RAN 160, one of the network incident data structures 156 is recorded to describe the software error in the RAN 160. In order to identify the incident management data structures 154 that handles the software error in the RAN 160, a particular incident management data structure 154 includes network incident identification characteristics that identify a software error that is correctable through the particular incident management data structure 154. If the network incident identification characteristics of the incident management data structure 154 match the description of the network incident in the network incident data structure 156, then the network incident management computer software 127 identifies the particular incident management data structure 154 as the target incident management data structure 154. The network incident management computer software 127 implements automated ticket generation rules of the incident management data structure 154 to automatically generate a ticket incident data structure 152.

In some embodiments, the ticket incident data structure 152 describes the network incident; schedules service for the network incident, gathers details for debugging or correcting the network incident, gathers logs related to the network incident, assigns groups or personnel responsible for correcting and authorizing network changes for the network incident, and/or the like. In some embodiments, the network incident management computer software 127 automatically transmits the ticket incident data structure 152 to the responsible groups or personnel, such as to the user devices 107, 109 of users 130, 140. In some embodiments, the ticket incident data structure 152 includes an algorithm (e.g., a script) for administering the ticket in an automated manner. In some embodiments, the ticket incident data structure 152 includes an algorithm (e.g., a script) for correcting or fixing the network incident on the computer network 105.

Examples of user devices 107, 109 include a cellular phone, a smart phone, a session initiation protocol (SIP) phone, a laptop, a desktop, a smart watch, a personal digital assistant (PDA), a satellite radio, a global positioning system, a multimedia device, a video device, a digital audio player (e.g., MP3 player), a camera, a game console, a tablet, a smart device, and a wearable communication device.

The user device 107 includes one or more processors(s) 139. The user device 107 also includes a non-transitory computer readable medium 135. The non-transitory computer readable storage medium 135 stored computer executable instructions 137. In some embodiments, non-transitory computer readable medium 135 include a random-access memory (RAM), a read-only memory (ROM), an electrically erasable programmable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. When the processor(s) 139 executes the computer executable instructions 137, the processor(s) 139 are configured to execute the functionality described for the user device 107 herein.

The user device 109 includes one or more processors(s) 141. The user device 109 also includes a non-transitory computer readable medium 143. The non-transitory computer readable storage medium 143 stored computer executable instructions 142. In some embodiments, non-transitory computer readable medium 143 include a random-access memory (RAM), a read-only memory (ROM), an electrically erasable programmable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. When the processor(s) 141 executes the computer executable instructions 142, the processor(s) 141 are configured to execute the functionality described for the user device 109 herein.

In some embodiments, the user devices 107, 109 are used by the users 130, 140 to transmit instructions, user selections, and user input to the network incident management computer software 127 implemented by the network incident management computer device 102. In some embodiments, the users 130, 140 input instructions, user selections, and user input for the network incident management computer software 127 directly to the network incident management computer device 102.

The network incident management computer device 102 is configured to implement the computer executable instructions 124 through the processors 126 and generate a graphical user interface 144. In some embodiments, the GUI 144 is presented directly through a display device (not shown) of the network incident management computer device 102. In some embodiments, the GUI 144 is presented through a display device (not shown) of the user devices 107, 109.

In some embodiments, a crawler is implemented by the network incident management computer software 127 to detect network incidents on the computer network 105 and generate network incident data structure(s) 156 that describe the network incident. If no incident management data structure 154 exists for automatically generating a ticket incident data structure 152 for this type of network incident, the GUI 144 provides the users 130, 140 with the ability for setting up an incident management data structure 154 that can automate the generation of ticket incident data structure(s) for this type of network incident.

To set up the incident management data structures 154 that handle the generation of ticket incident data structure(s) 152, the GUI 144 includes one or more graphical items for defining a network incident type on the computer network 105. The network incident management computer software 127 receives one or more user selections of the first graphical items and generates one or more automated incident identification characteristics of an incident management data structure based on the user selections of the first graphical items. In this manner, network incident management computer software 127 defines the characteristics of a network incident on the computer network 105 for which it is capable of handling the generation of a ticket incident data structure 152.

Additionally, the network incident management computer software 127 receives user input that defines one or more automated ticket generation rules of the incident management data structure 154. The automated ticket generation rules are configured to automate the generation of the ticket incident data structure 152 for the network incident.

In some embodiments, the ticket incident data structures 152 are transmitted to maintenance personnel to correct or fix the incident on the computer network 105. In some embodiments, the ticket incident data structures 152 include instructions directed the maintenance personnel to repair or replace hardware on the computer network 105. In some embodiments, the ticket incident data structures 152 include instructions directed the maintenance personnel to update or reconfigure software implemented in the computer network 105. In some embodiments, the ticket described by the ticket incident data structure 152 is sent to approval personnel for approval of maintenance procedures before the maintenance personnel correct or fix the incident on the computer network 105. In response to approval being received by the appropriate personnel, maintenance personnel receive the ticket incident data structure 152 on user devices and implement the approved procedures to correct or fix the incident on the computer network 105.

Figure 2:
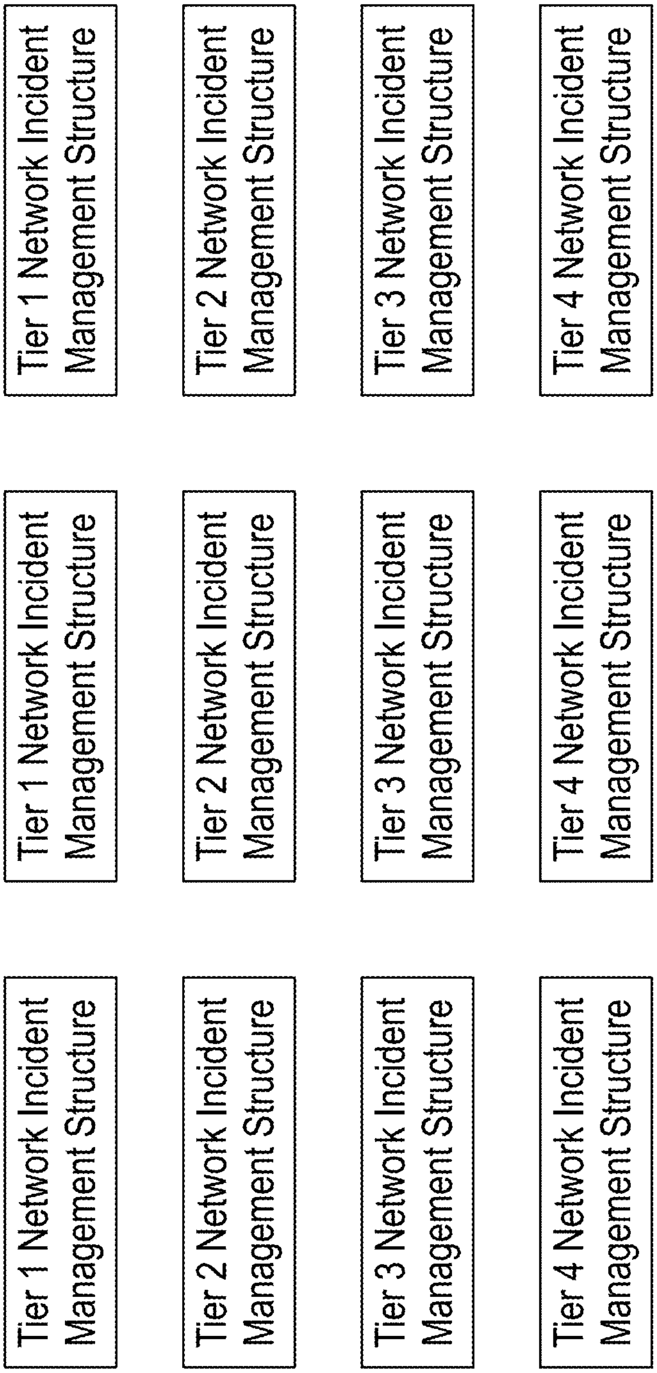
FIG. 2 illustrates network incident management data structures, in accordance with some embodiments.

FIG. 2 illustrates network incident management data structures, in accordance with some embodiments.

In some embodiments, the network incident management data structures of FIG. 2 are examples of the incident management data structures 154 in FIG. 1.

The network incident management data structures are organized into different subsets of incident management data structures. The different subsets of incident management data structures are organized into different tiers of incident management data structures. More specifically, one subset of incident management data structures are tier 1 of incident management data structures. Tier 1 of incident management data structures is the highest tier of incident management data structures. Another subset of incident management data structures are tier 2 of incident management data structures. Tier 2 of incident management data structures are the second highest tier of incident management data structures. Another subset of incident management data structures are tier 3 of incident management data structures. Tier 3 of incident management data structures are the third highest tier of incident management data structures. Another subset of incident management data structures are tier 4 of incident management data structures. Tier 4 of incident management data structures are the lowest tier of incident management data structures.

In FIG. 2, there are four tiers of incident management data structures. In other embodiments, there are more than four tiers of incident management data structures. In other embodiments, there are less than four tiers of incident management data structures.

To select a target incident management data structure 154 that matches a particular network incident data structure 156, the network incident management computer software 127 iterates through the incident management data structures 154 to find a match with the network incident data structure 156 in the order of the tiers. More specifically, the network incident management computer software 127 iterates through the one or more automated incident identification characteristics of the tier 1 the network incident management computer software 127 until a compliance is found or a predetermined condition is satisfied (e.g., a match is found between the automated incident identification characteristics and the description of the network incident data structure 156). If compliance is not found or if the predetermined condition is not met, the network incident management computer software 127 iterates through the one or more automated incident identification characteristics of the tier 2 the network incident management computer software 127 until a compliance is found or a predetermined condition is satisfied (e.g., a match is found between the automated incident identification characteristics and the description of the network incident data structure 156). If compliance is not found or if the predetermined condition is not met, the network incident management computer software 127 iterates through the one or more automated incident identification characteristics of the tier 3 the network incident management computer software 127 until a compliance is found or a predetermined condition is satisfied (e.g., a match is found between the automated incident identification characteristics and the description of the network incident data structure 156). If compliance is not found or if the predetermined condition is not met, the network incident management computer software 127 iterates through the one or more automated incident identification characteristics of the tier 4 the network incident management computer software 127 until a compliance is found or a predetermined condition is satisfied (e.g., a match is found between the automated incident identification characteristics and the description of the network incident data structure 156). If there has been iteration through all of the tiers 1, 2, 3, 4, then an incident management data structure 154 does not exist for the network incident data structure 156. In some embodiments, a user 130, 140 then uses the GUI 144 to set up an new incident management data structure 154 to handle these new type of network incident. However, if compliance is found or the precondition is met in one of the tiers, then the automated ticket generation rules of the first matching incident management data structure 154 are implemented to generate a ticket incident data structure 152.

Figure 3:
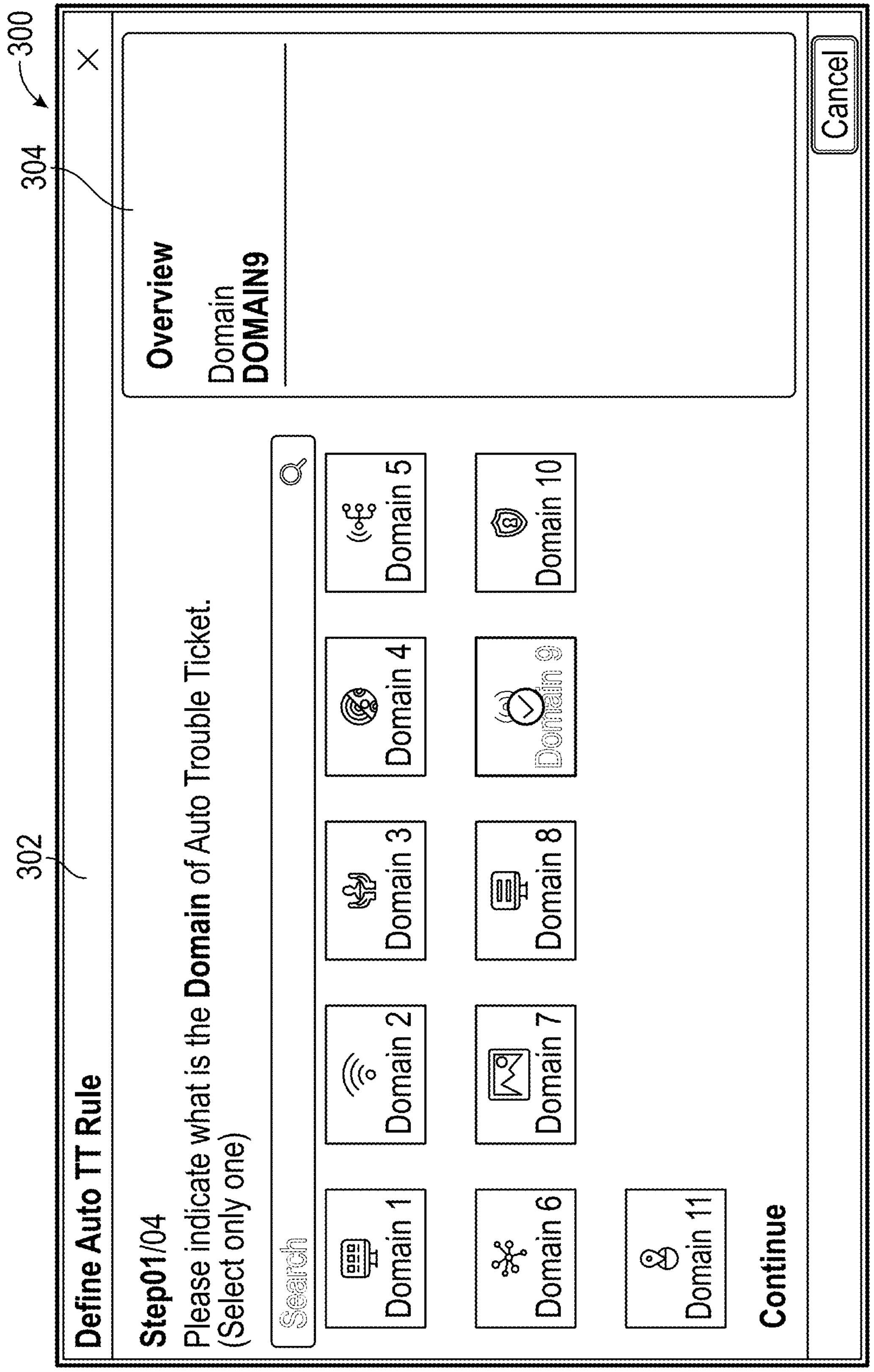
FIG. 3 are panels of a GUI that are used to select the automated incident identification characteristics of an incident management data structure, in accordance with some embodiments.

FIG. 3 are panels 302, 304 of a GUI 300 that are used to select the automated incident identification characteristics of an incident management data structure 154, in accordance with some embodiments.

Panel 302 includes graphical items that each indicate a different domain in the computer network 105. The graphical items are named domain 1-domain 11 and have graphical symbols to identify different domains in the computer network 105. A user selection of one of the domains defines the domain in the computer network 105 of the incident management data structure 154 being defined. In this case, the user selection has selected domain 9. As a result, the selection of domain 9 is shown in the panel 304. Accordingly, the description of the network incident data structure 156 matches the incident management data structure 154 being defined in panel 302 if the network incident described by the network incident data structure 156 is related to domain 9.

Figure 4:
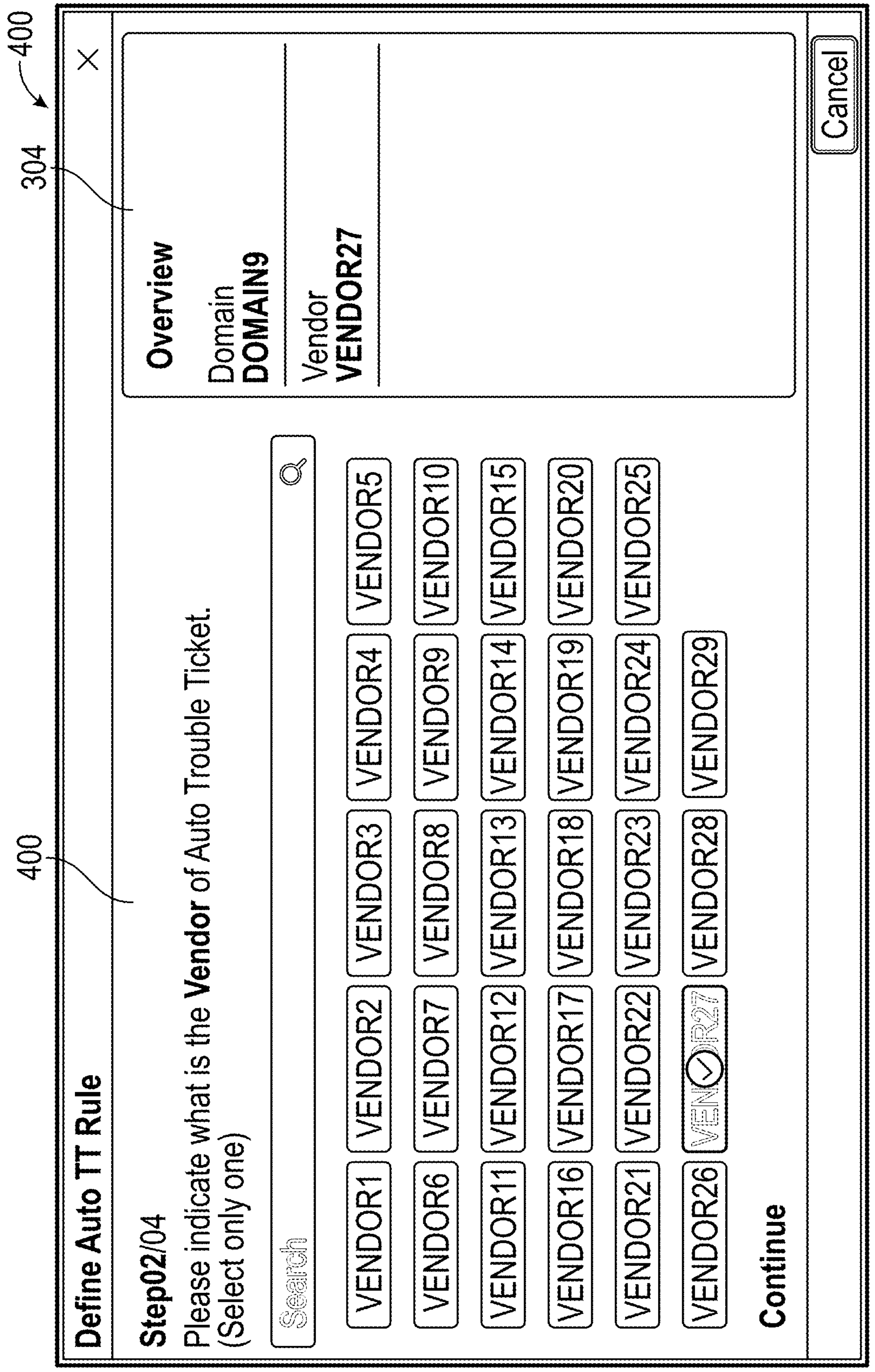
FIG. 4 are panels of the GUI that are used to select the automated incident identification characteristics of an incident management data structure, in accordance with some embodiments.

FIG. 4 are panels 400, 304 of the GUI 300 that are used to select the automated incident identification characteristics of an incident management data structure 154, in accordance with some embodiments.

Panel 400 includes graphical items that each indicate different vendors that service the computer network 105. The graphical items are named vendor 1-vendor 29 and have graphical symbols to identify different vendors that service the computer network 105. A user selection of one of the vendors defines the vendor in the computer network 105 of the incident management data structure 154 being. In this case, the user selection has selected vendor 27. As a result, the selection of vendor 27 is shown in the panel 304. Accordingly, the description of the network incident data structure 156 matches the incident management data structure 154 being defined in panel 400 if the network incident described by the network incident data structure 156 is related to vendor 27.

Figure 5:
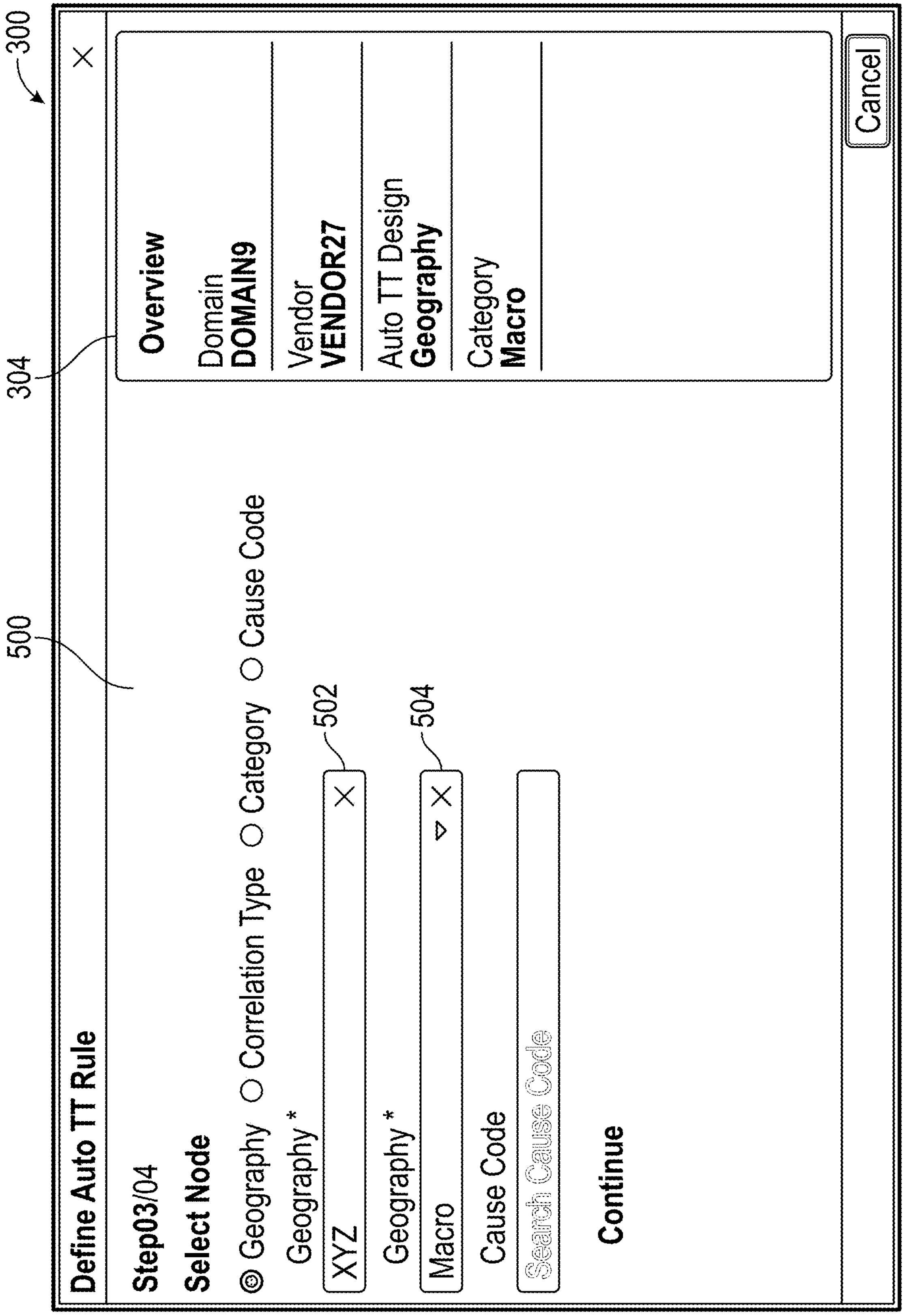
FIG. 5 are panels of the GUI that are used to select the automated incident identification characteristics of an incident management data structure, in accordance with some embodiments.

FIG. 5 are panels 500, 304 of the GUI 300 that are used to select the automated incident identification characteristics of an incident management data structure 154, in accordance with some embodiments.

Panel 500 includes graphical items for selecting between geography, correlation type, category, and cause code. By receiving a user selection of geography, the user can define automated incident identification characteristics of the incident management data structure 154 as geographical incident identification characteristics. Panel 500 includes a text box 502 where a user enters user text to define the geography of the geographical incident identification characteristics. A selection menu 504 provides category selections that related to the geographical selection. In some embodiments, the category under geography-based auto ticket generation rules that distinguishes the types of services and device type auto tickets to be generated. This is because in a geographical area lots of network incidents occur but automated ticket generations is performed for only for few specific network incidents within in the geographical area. In some embodiments, categories also include a v device type, device type, and/or any other category that is relevant to the network incidents on the computer network. In this case, a user selection of the macro category has been received. A user selection of one of the geography defines the geographical location of the incident management data structure 154 being. As a result, the selection of geography is shown in the panel 304, along with the selection of Macro. Accordingly, the description of the network incident data structure 156 matches the incident management data structure 154 being defined in panel 500 if the network incident described by the network incident data structure 156 is related to the defined geographical location. In some embodiments, geographical incident management data structures 154 are tier 1 incident management data structures as discussed in FIG. 2.

Figure 6:
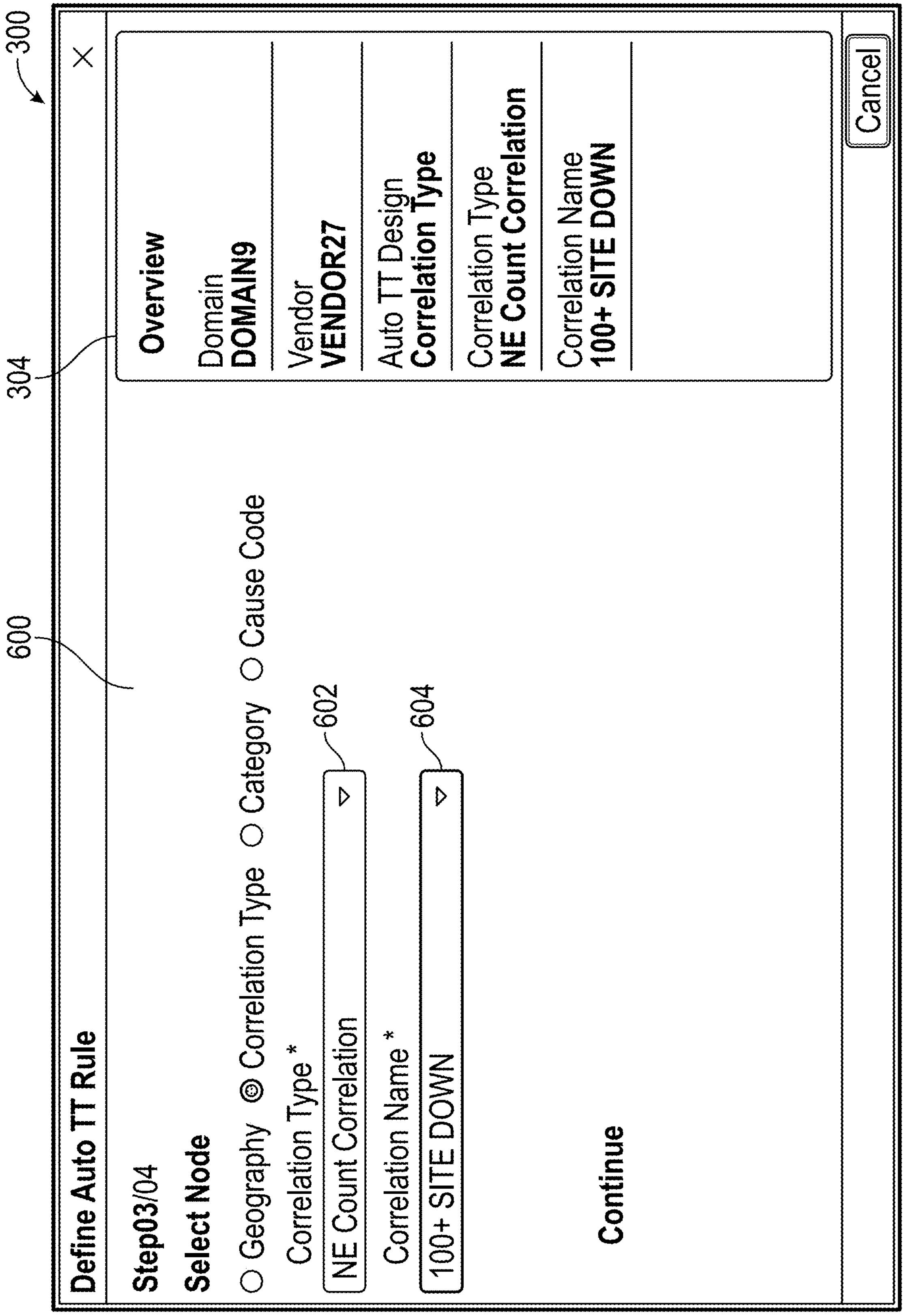
FIG. 6 are panels of the GUI that are used to select the automated incident identification characteristics of an incident management data structure, in accordance with some embodiments.

FIG. 6 are panels 600, 304 of the GUI 300 that are used to select the automated incident identification characteristics of an incident management data structure 154, in accordance with some embodiments.

Panel 600 includes graphical items for selecting between geography, correlation type, category, and cause code. By receiving a user selection of correlation type, the user can define automated incident identification characteristics of the incident management data structure 154 as correlation type incident identification characteristics. Panel 600 includes a selection menu 602 where a user selects a correlation type that defines the correlation type of the correlation type incident identification characteristics. Correlation type relates to algorithms. In some embodiments, correlation type include Topology Correlation, Mass Outage Alarm Correlation, Parent Child Alarm Correlation, Managed Object Correlation, and Self-Correlation & Normal Correlation. It should be noted that correlation types are added and removed in accordance with the algorithms available, in accordance with some embodiments, a selection menu 604 provides category selections that related to the correlation name. Correlation name is the name of rule users defined at the time of configuring incident creation rule. For example, at the time of configuring a Mass Outage correlation rule, the user sets some conditions to for generating a ticket and which system generates the ticket. In some embodiments, this also helps a user to identify which rule incident and auto ticket has been created. In this case, a user selection of the 100+Site Down name has been received. A user selection of one of the correlation type defines the correlation type of the incident management data structure 154 being. As a result, the selection of correlation type and correlation name are shown in the panel 304. Accordingly, the description of the network incident data structure 156 matches the incident management data structure 154 being defined in panel 500 if the network incident described by the network incident data structure 156 is related to the defined correlation type. In some embodiments, correlation type incident management data structures 154 are tier 2 incident management data structures as discussed in FIG. 2.

Figure 7:
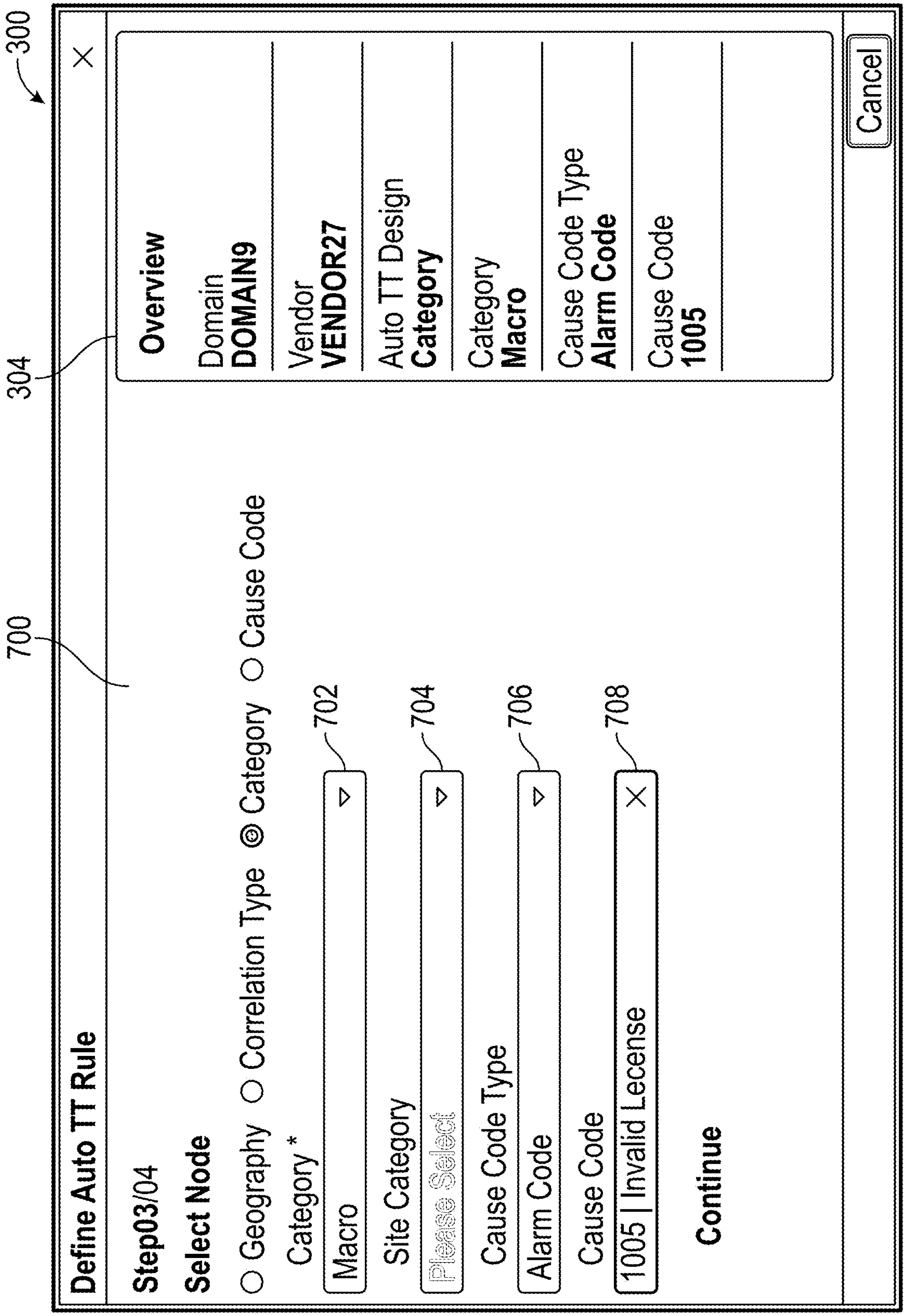
FIG. 7 are panels of the GUI that are used to select the automated incident identification characteristics of an incident management data structure, in accordance with some embodiments.

FIG. 7 are panels 700, 304 of the GUI 300 that are used to select the automated incident identification characteristics of an incident management data structure 154, in accordance with some embodiments.

Panel 700 includes graphical items for selecting between geography, correlation type, category, and cause code. By receiving a user selection of category, the user can define automated incident identification characteristics of the incident management data structure 154 as category incident identification characteristics. Panel 700 includes a selection menu 702 where a user selects a category of the category incident identification characteristics. The categories can vary and, in some embodiments, the categories are derived from pasts network incidents created on a type of service or a type of network device, For example if an incident is created due to a connection failure between two Routers a category is an identifier for Router Type (e.g., AG1). In this case, the category of Macro has been selected. A selection menu 704 provides site category that related to the category. Site category is the classification of devices based on their importance, For example, when a service provides data to military area, then the site category is VVIP to identify a single point of failure on services to be monitored and fixed on priority. In some embodiments, an auto ticket framework has the capability to add more configuration based field type to filter out incident tickets. Panel 700 also includes a selection menu 704 where a user selects a cause code type of the category incident identification characteristics. Cause Code types define the type of problem for which an incident is created. Values for cause code types differ based on an incident creation algorithm, in some embodiments. For example, if an incident is created using events or alarms the value is an Alarm Code. In another example if the incident is created using performance management of Key Performance Indicators (KPIs) the Cause Code is the KPI. In this case, the cause code type of the Alarm Code has been selected. A selection menu 708 provides cause codes that related to the cause code type. In this example, a cause code of an invalid license is selected. Accordingly, the description of the network incident data structure 156 that matches the incident management data structure 154 being defined in panel 700 is selected as the target incident management data structure 154. In some embodiments, category incident management data structures 154 are tier 3 incident management data structures as discussed in FIG. 2. The selection of category, macro, alarm code, and cause code are shown in the panel 304.

Figure 8:
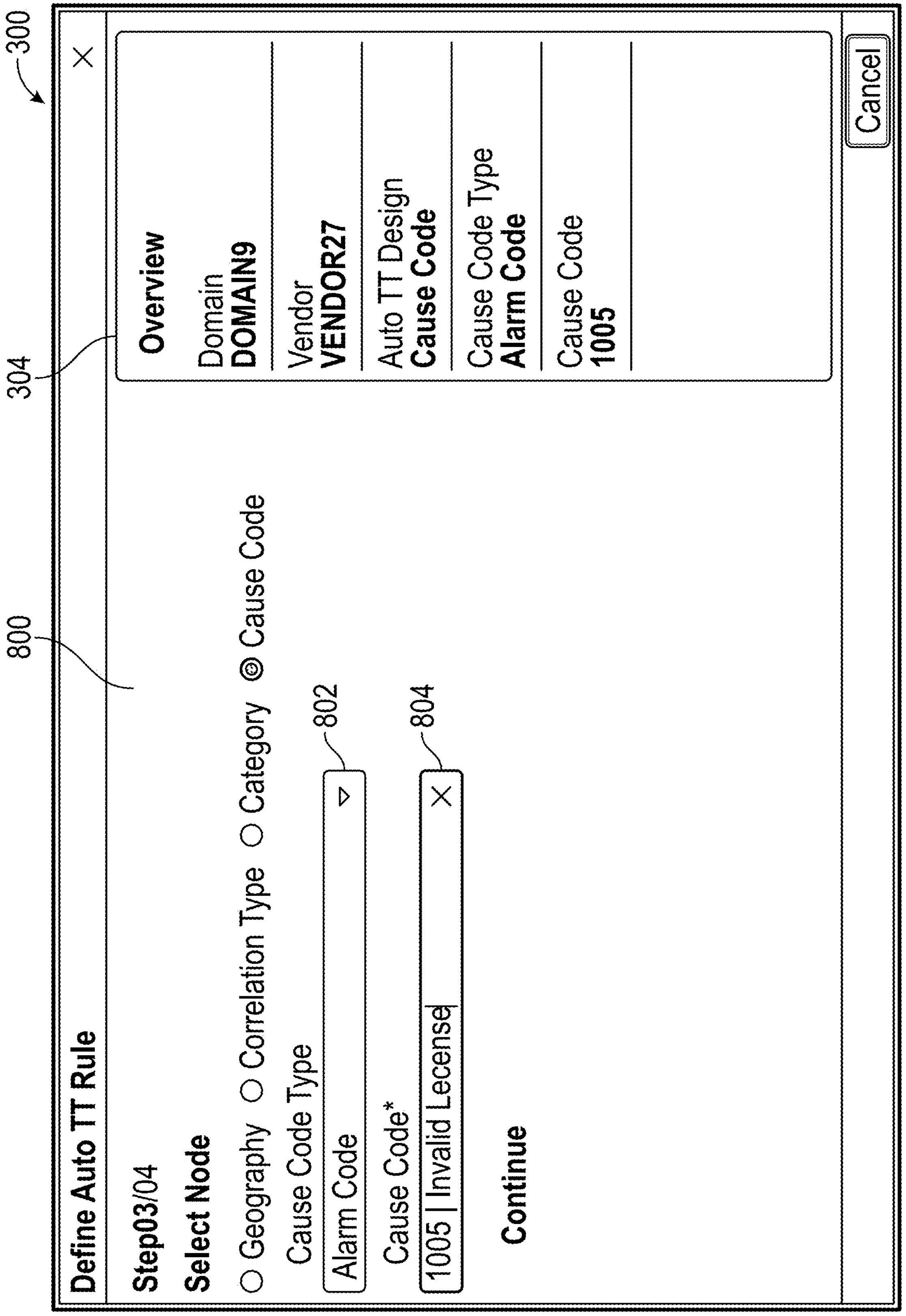
FIG. 8 are panels of the GUI that are used to select the automated incident identification characteristics of an incident management data structure, in accordance with some embodiments.

FIG. 8 are panels 800, 304 of the GUI 300 that are used to select the automated incident identification characteristics of an incident management data structure 154, in accordance with some embodiments.

Panel 800 includes graphical items for selecting between geography, correlation type, category, and cause code. By receiving a user selection of cause code, the user can define automated incident identification characteristics of the incident management data structure 154 as cause code incident identification characteristics. Panel 800 also includes a selection menu 802 where a user selects a cause code type of the category incident identification characteristics. In this case, the cause code type of the Alarm Code has been selected. A selection menu 804 provides cause codes that related to the cause code type. In this example, a cause code of an invalid license is selected. Accordingly, the description of the network incident data structure 156 that matches the incident management data structure 154 being defined in panel 800 is selected as the target incident management data structure 154. In some embodiments, cause code incident management data structures 154 are tier 4 incident management data structures as discussed in FIG. 2. The selection of, alarm code, and cause code are shown in the panel 304.

Figure 9:
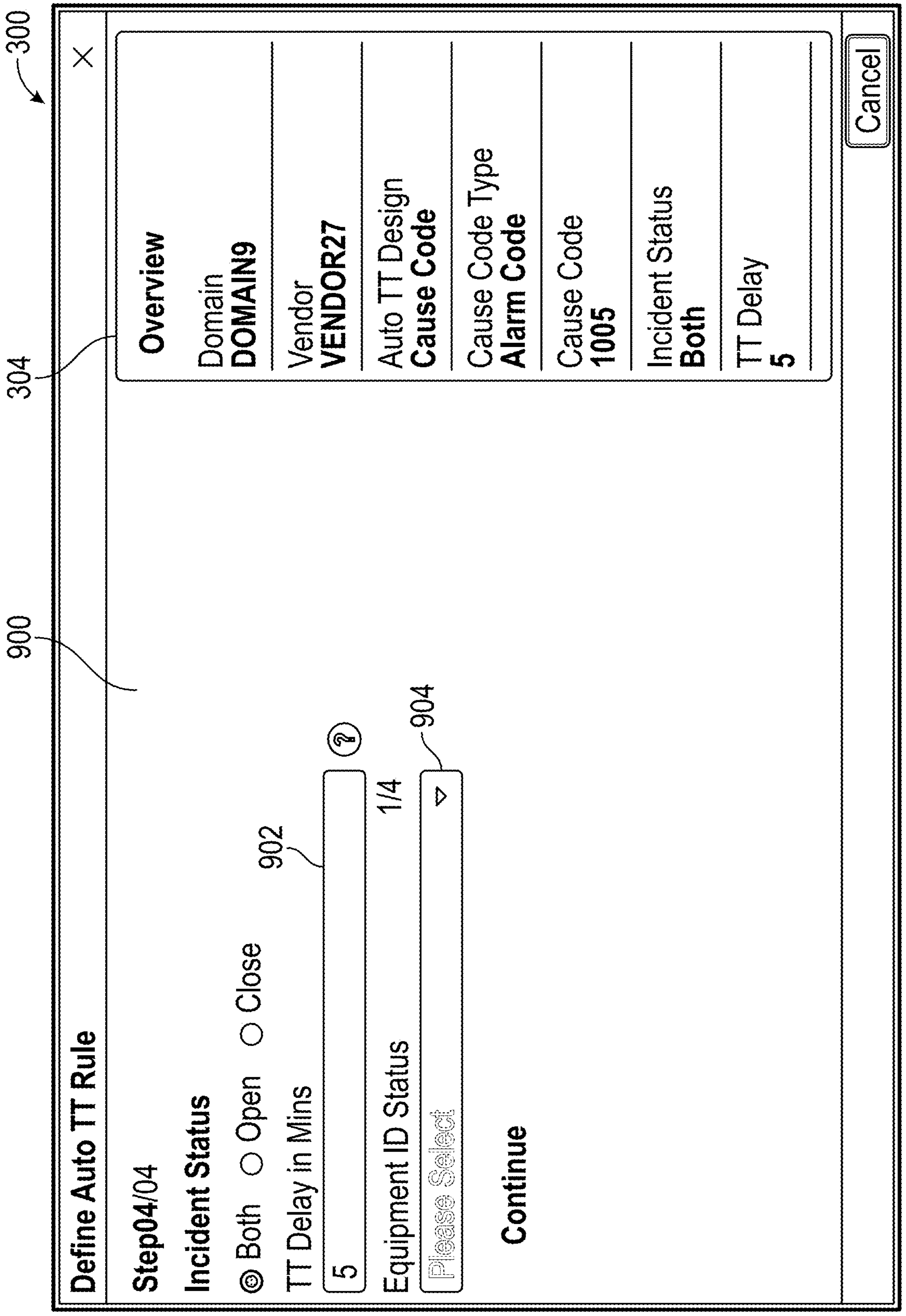
FIG. 9 are panels of the GUI that are used to select the automated incident delay of an incident management data structure, in accordance with some embodiments.

FIG. 9 are panels 900, 304 of the GUI 300 that are used to select the automated incident delay of an incident management data structure 154, in accordance with some embodiments.

Panel 900 includes graphical items for selection of an incident status for automated incident identification characteristics of the incident management data structure 154. The incident status of the incident management data structure 154 matching the incident status of the network incident data structure 156, then one of the characteristics for matching the incident management data structure 154 and the network incident data structure 156 is met.

Graphical items are included for selecting between an incident status of both, an incident status of open, and an incident status of closed. In some embodiments, an Auto Ticket is created both during the opening and the closing of an incident (i.e., both the statuses of incident). In response to a problem occurring on the network the incident is closed immediately, but the incident is not fixed in some embodiments. As a result, automated ticket generation is generated in both incident statuses. In some embodiments, in response to a network incident being fixed, the RCA of the problem in is determined for the ticket so that similar incidents are not generated in the future. In FIG. 9, the incident status of both has been selected. The selection is shown in panel 304.

In FIG. 9, a text box 902 is proved in panel 900. The text box 902 is named "TT Delay in Mins). A number is input into the text box 902 to define a number of minutes for a delay. Panel 304 indicates the number entered into the text box 902. In other embodiments, the delay is indicated in some other temporal unit other than minutes (e.g., seconds, hours, days, etc.).

In response to the incident status being closed, then the network incident management computer software 127 determines a temporal difference between an incident start time in the network incident data structure 156 and the end time in the network incident data structure 156. In response to the temporal difference between the incident start time and the incident end time being greater than the delay, then then the network incident management computer software 127 implements an incident closing script in the target incident management data structure 154 that closes the incident related with the network incident data structure 156 and generates a ticket incident data structure 152 that indicates that the incident has been closed.

In response to the incident status being open, then the network incident management computer software 127 determines whether an incident start time in the network incident data structure 156 and the end time in the network incident data structure 156. In response to the temporal difference between the incident start time and the current time being greater than the delay, then then the network incident management computer software 127 implements a script from the incident management data structure 154 that generates a ticket incident data structure 152 for the incident described by the network incident data structure 156. In some embodiments, the script also automatically sends notifications regarding the ticket incident data structure 152 to the appropriate personnel. In some embodiments, the script also implements procedures to deal of fix the incident related to the ticket incident data structure 152 that has been generated.

Panel 900 also includes a selection box named "Equipment ID Status." Equipment ID Status is a filter criteria for auto ticket creation. This field filters the incident for which auto ticket implemented by a user that is not based on the service status of device and service. In some embodiments, few devices in network can be ignored and are monitored during an initial phase of configuration. The failure of network devices during configuration sometimes result in failure, which are sometimes to be ignored or implemented for a different type of ticket assignment.

Figure 10:
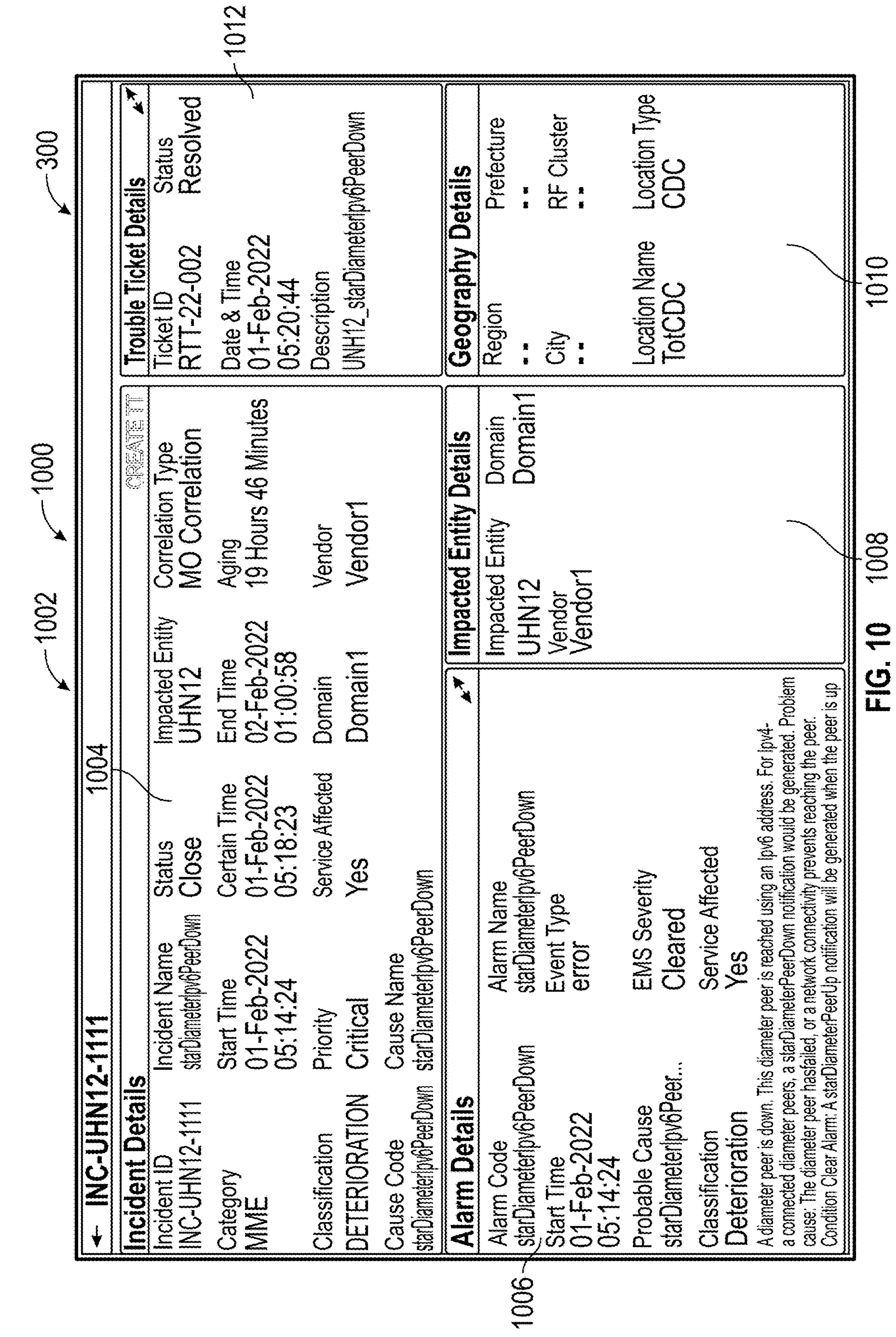
FIG. 10 is a panel that includes a visual representation of a network incident data structure shown in the GUI, in accordance with some embodiments.

FIG. 10 is a panel 1000 that includes a visual representation of a network incident data structure 1002 shown in the GUI 300, in accordance with some embodiments.

Network incident data structure 1002 is an example of the network incident data structure 156. The panel 1000 includes a subpanel 1004. The subpanel 1004 includes incident details (i.e., "Incident Details" in FIG. 10) for an incident on the computer network 105. The subpanel 1004 includes an identification that identifies the incident (i.e., "Incident ID" in FIG. 10), a name for the incident (i.e., "Incident Name" in FIG. 10), a name for the incident (i.e., "Incident Name" in FIG. 10), a status for the incident (i.e., "Status" in FIG. 10), an identifier for an entity impacted by the incident (i.e., "Impacted Entity" in FIG. 10), a correlation type for the incident (i.e., "Correlation Type" in FIG. 10), a category of the incident (i.e., "Category" in FIG. 10), a start time for the incident (i.e., "Start Time" in FIG. 10), a creation time for the incident (i.e., "Creation Time" in FIG. 10), an end time for the incident (i.e., "End Time" in FIG. 10), an age of the incident (i.e., "Age" in FIG. 10), a classification for the incident (i.e., "Classification" in FIG. 10), a priority for the incident (i.e., "Priority" in FIG. 10), whether services are affected by the incident (i.e., "Service Affected" in FIG. 10), a domain identifier for the incident (i.e., "Domain" in FIG. 10), a third party service provider related to the incident (i.e., "Vendor" in FIG. 10), a cause code that describes a code of the incident (i.e., "Cause Code" in FIG. 10), and a name that identifies the cause of the incident (i.e., "Cause Name" in FIG. 10).

The subpanel 1006 includes alarm details (i.e., "Alarm Details" in FIG. 10) that describe an alarm that was triggered on the computer network 105 as a result of the incident on the computer network 105. The subpanel 1006 includes an alarm code that identifies the alarm (i.e., "Alarm Code" in FIG. 10), an alarm code that identifies the alarm (i.e., "Alarm Code" in FIG. 10), an alarm name of the alarm (i.e., "Alarm Name" in FIG. 10), an start time of the alarm (i.e., "Start Time" in FIG. 10), an event type related to the alarm (i.e., "Event Type" in FIG. 10), the most likely cause of the alarm (i.e., "Probable Cause" in FIG. 10), a severity of the incident (i.e., "EMS Severity" in FIG. 10), a classification of the incident caused the alarm (i.e., "Classification" in FIG. 10), and whether services are affected by the incident that caused the alarm (i.e., "Service Affected" in FIG. 10). A description of the incident that caused the alarm along with other details related to the alarm.

The subpanel 1008 includes details related to entities impacted by the incident (i.e., "Impacted Entity Details" in FIG. 10) as a result of the incident on the computer network 105. The subpanel 1008 includes an identifier that identifies an entity impacted by the incident (i.e., "Impacted Entity" in FIG. 10), a domain of the entity impacted by the incident (i.e., "Domain" in FIG. 10), and a third party identifier that services the entity affected by the incident (i.e., "Vendor" in FIG. 10).

The subpanel 1010 includes geographical details related to the incident (i.e., "Geography Details" in FIG. 10) on the computer network 105. The subpanel 1010 includes an identifier of a region impacted by the incident (i.e., "Region" in FIG. 10), an identifier of a region prefecture by the incident (i.e., "Prefecture" in FIG. 10), an name of a city related to the incident (i.e., "City" in FIG. 10), an identifier of an RF Cluster related to the incident (i.e., "RF Cluster" in FIG. 10), an identifier of a location name related to the incident (i.e., "Location Name" in FIG. 10), and a type of location related to the incident (i.e., "Location Type" in FIG. 10).

The subpanel 1012 includes ticket details related to a ticket generated for the incident (i.e., "Geography Details" in FIG. 10) on the computer network 105. Accordingly, in this example, a target incident management data structure 154 was already selected by the network incident management computer software 127 and a script from the target incident management data structure 154 was already implemented to generate the ticket incident data structure 152. The subpanel 1012 includes details related to the ticket incident data structure 152 that describes the ticket generated by the network incident management computer software 127 for the incident. In other embodiments, before the target incident management data structure 154 was selected for the network incident data structure 1002 by the network incident management computer software 127, the fields in the subpanel 1012 are empty. The subpanel 1012 includes an identifier for the ticket (i.e., "Ticket ID" in FIG. 10), a status for the ticket (i.e., "Ticket ID" in FIG. 10), a day and time that the ticket was generated (i.e., "Date & Time" in FIG. 10), and a description of the ticket (i.e., "Description" in FIG. 10).

Figure 11A:
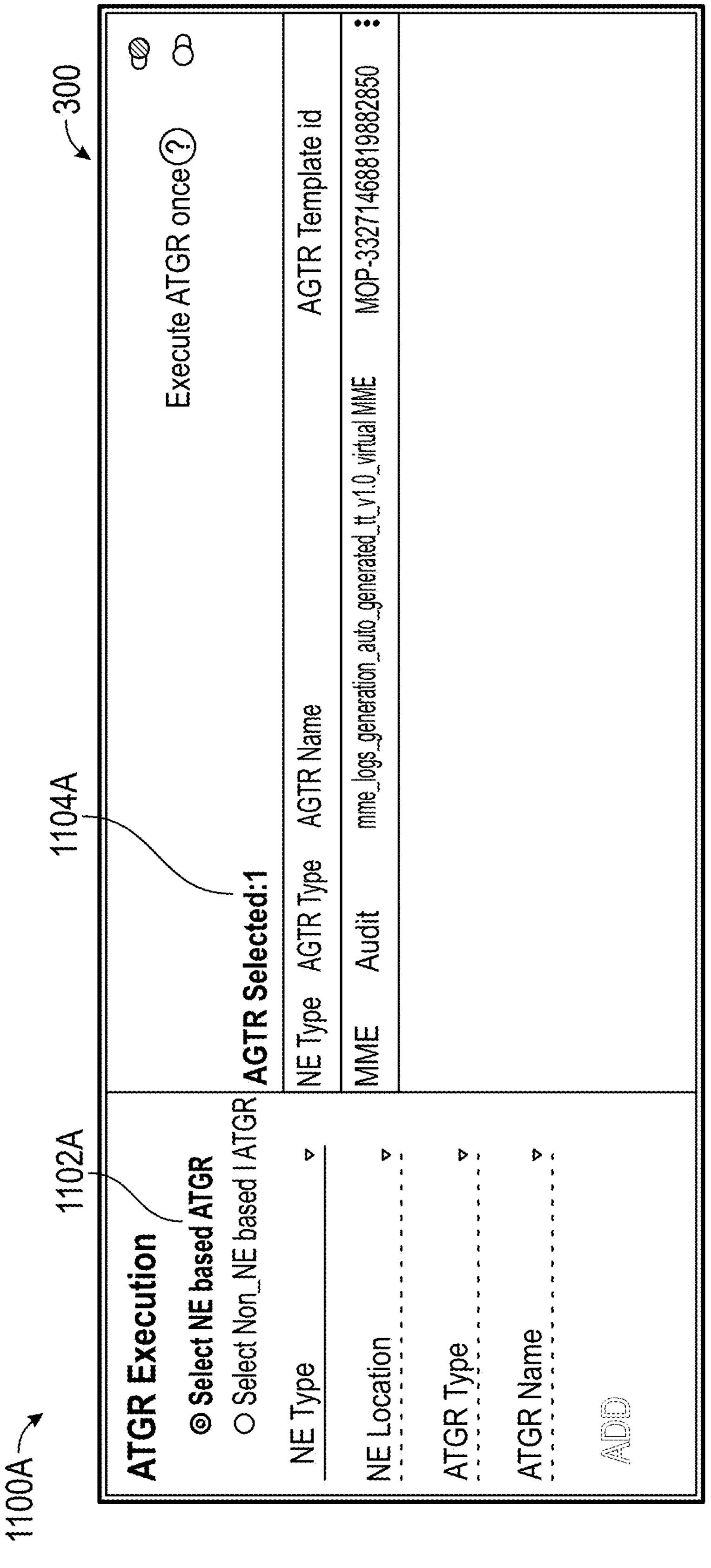
FIGS. 11A-11C illustrate panels in the GUI for selecting the assignment of automated ticket generation rules of an incident management data structure of FIG. 1, in accordance with some embodiments.
Figure 11B:
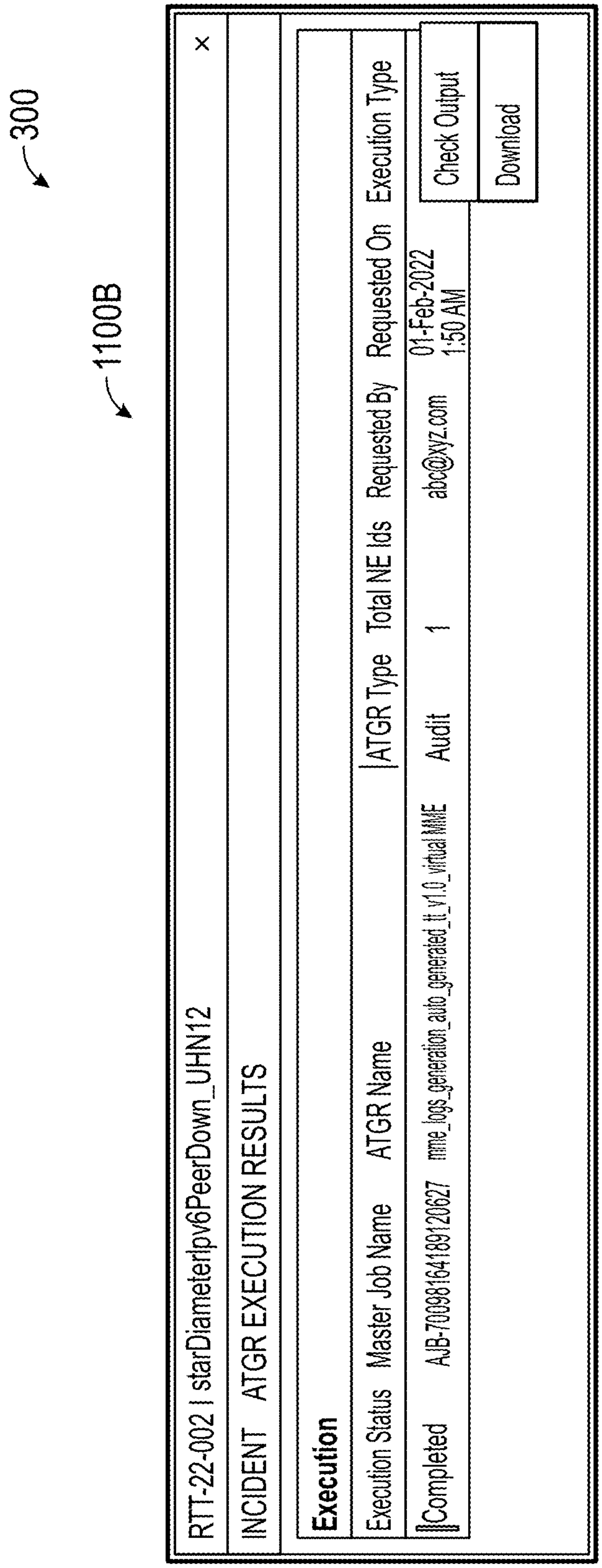
Figure 11C:
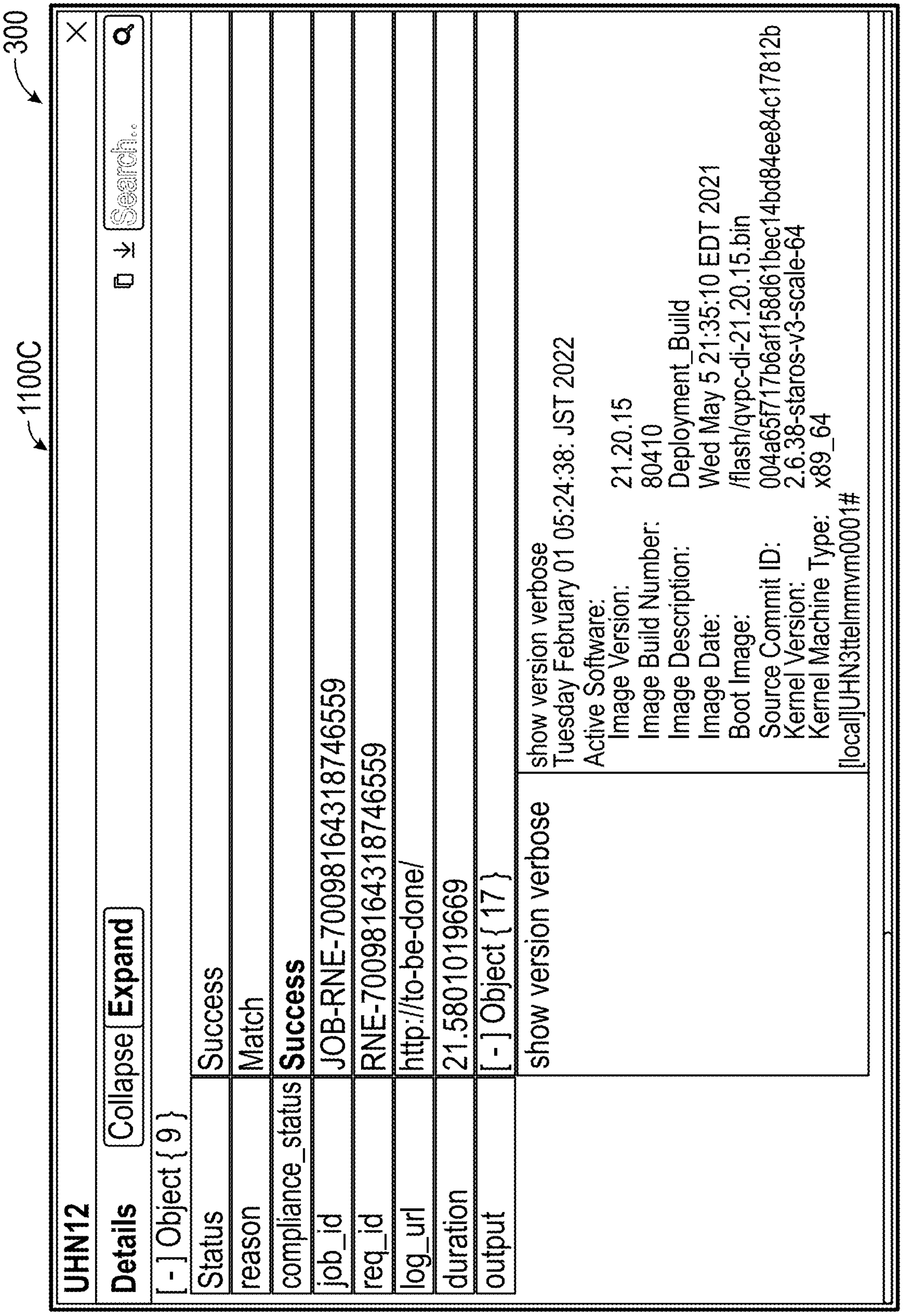

FIGS. 11A-11C illustrate panels 1100A, 1100B, 1100C in the GUI 300 for selecting the assignment of automated ticket generation rules ("ATGR" in FIGS. 11A-11C) of an incident management data structure 154 of FIG. 1, in accordance with some embodiments.

Panel 1100A in FIG. 11A includes subpanels 1102A, 1104A. Subpanel 1102A provides options for selecting whether the automated ticket generation rules are related to a network element (NE) in the computer network 105 (i.e., "Select NE based ATGR" in FIG. 11A) or not related to a network element (i.e., "Select Non_NE based ATGR" in FIG. 11A). Subpanel 1102A includes a selection bar to receive a user selection of a network element type (i.e., "NE Type" in FIG. 11A), a selection bar to receive a user selection of a location of the network element (i.e., "NE Location" in FIG. 11A), a selection bar to receive a user selection that describes a type of the automated ticket generation rules, (i.e., "ATGR Type" in FIG. 11A), and a selection bar to receive a user selection that describes a name of the automated ticket generation rules, (i.e., "ATGR Name" in FIG. 11A).

Subpanel 1104A illustrates details regarding a selected template of the automated ticket generation rules. In some embodiments, the automated ticket generation rules are a script. Subpanel 1104A includes table with fields that describe a network element type (i.e., "NE Type" in FIG. 11A), a location of the network element (i.e., "NE Location"

in FIG. 11A), a type of the automated ticket generation rules, (i.e., "ATGR Type" in FIG. 11A), and automated ticket generation rules identifier for the template used to generate the rules (i.e., "ATGR Template ID" in FIG. 11A).

Panel 1100B in FIG. 11B is a selection panel for selecting a ticket incident data structure 152 in FIG. 1 that is generated as a result of implementing an incident management data structure 154 of FIG. 1. Panel 1100B includes a table that includes data fields related to the ticket incident data structure 152, including an execution status field that describes the status of the automated ticket generation rules (i.e., "Execution Status" in FIG. 11B), an name for the job that described the job name (i.e., "Master Job Name" in FIG. 11B), a name of the automated ticket generation rules, (i.e., "ATGR Name" in FIG. 11B), a type of the automated ticket generation rules, (i.e., "ATGR Type" in FIG. 11B), an identifier for who made the request that the ticket incident data structure 152 in FIG. 1 be generated (i.e., "Requested By" in FIG. 11B), a time and date for the request that the ticket incident data structure 152 in FIG. 1 be generated (i.e., "Requested On" in FIG. 11B), and an execution type for obtaining or viewing the ticket incident data structure 152 in FIG. 1 be generated (i.e., "Execution Type" in FIG. 11B).

Panel 1100C in FIG. 11C is an informative screen that visually illustrate data fields related to the generation of a ticket incident data structure 152 in FIG. 1 as a result of the implementation of the automated ticket generation rules. Panel 1100C includes a table that includes data fields related to the execution of the automated ticket generation rules in order to generate the ticket incident data structure 152, including an execution status field that describes the status of the automated ticket generation rules (i.e., "Status" in FIG. 11C), a reason field that describes the reason for implementing the automated ticket generation rules (i.e., "Reason" in FIG. 11C), a compliance status field that describes whether the ticket incident data structure 152 is in compliance with compliance parameters (i.e., "Reason" in FIG. 11C), a job field that identifies a job for executing the automated ticket generation rules (i.e., "job_id" in FIG. 11C), a request field that identifies the request that result in the execution of the automated ticket generation rules (i.e., "req_id" in FIG. 11C), a log location that identifies a log related to the execution of the automated ticket generation rules (i.e., "log_url" in FIG. 11C), a duration field that identifies the amount of time it took to generate the ticket incident data structure 152 from the automated ticket generation rules (i.e., "duration" in FIG. 11C), and an output field that describes technical characteristics of the ticket incident data structure 152 generated as a result of executing the automated ticket generation rules (i.e., "output" in FIG. 11C).

The output field includes several subfields in order to describe the technical characteristics of the resulting ticket incident data structure 152. The output field in FIG. 11C includes a date for generating the ticket incident data structure 152, an image version subfield that describes an image version of the automated ticket generation rules (i.e., "Image Version" in FIG. 11C), an image build subfield that describes an image build of the automated ticket generation rules (i.e., "Image Version" in FIG. 11C), an image description subfield that describes an image of the automated ticket generation rules (i.e., "Image Description" in FIG. 11C), an image date for creating the automated ticket generation rules (i.e., "Image Date" in FIG. 11C), a boot image of the automated ticket generation rules (i.e., "Boot Image" in FIG. 11C), a source identifier of the automated ticket generation rules (i.e., "Source Commit ID" in FIG. 11C), a kernel version for implementing the automated ticket generation rules (i.e., "Kernel Version" in FIG. 11C), and a machine identifier that identifies a machine that the kernel was implemented on (i.e., "Kernel Machine Type" in FIG. 11C).

Figure 12A:
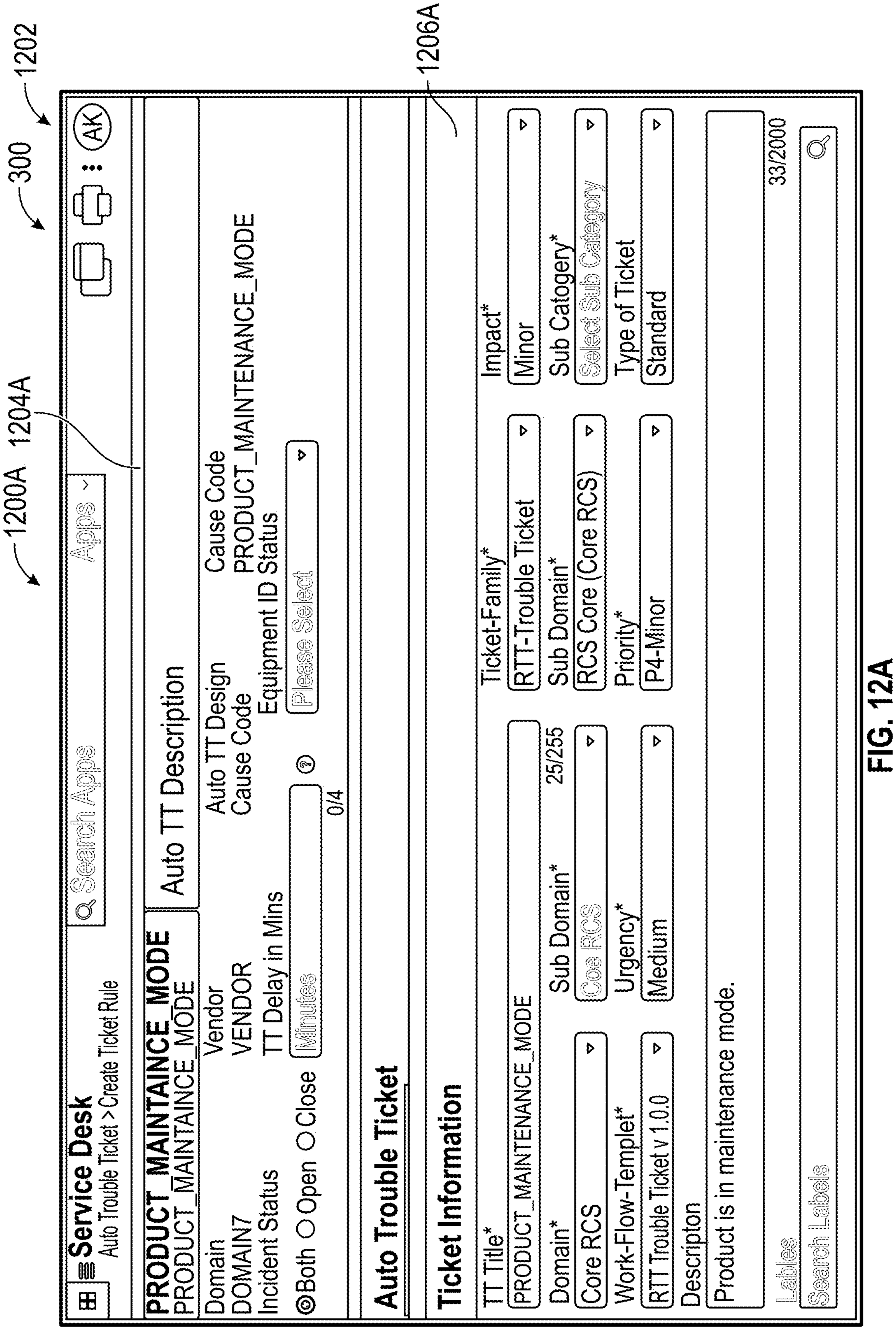
FIGS. 12A-12C illustrate panels in the GUI that visually illustrates an example of a ticket incident data structure, in accordance with some embodiments.
Figure 12B:
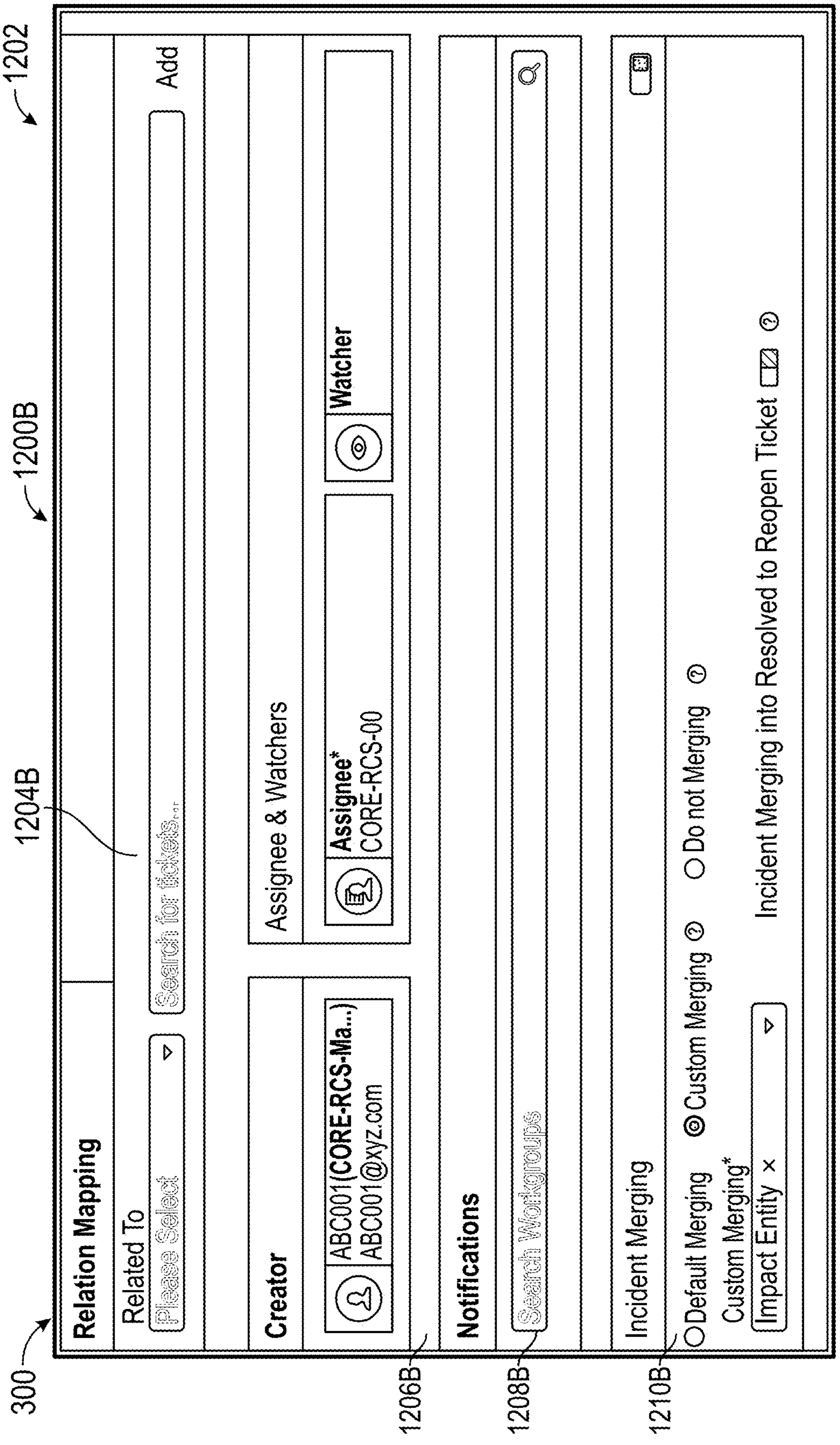
Figure 12C:
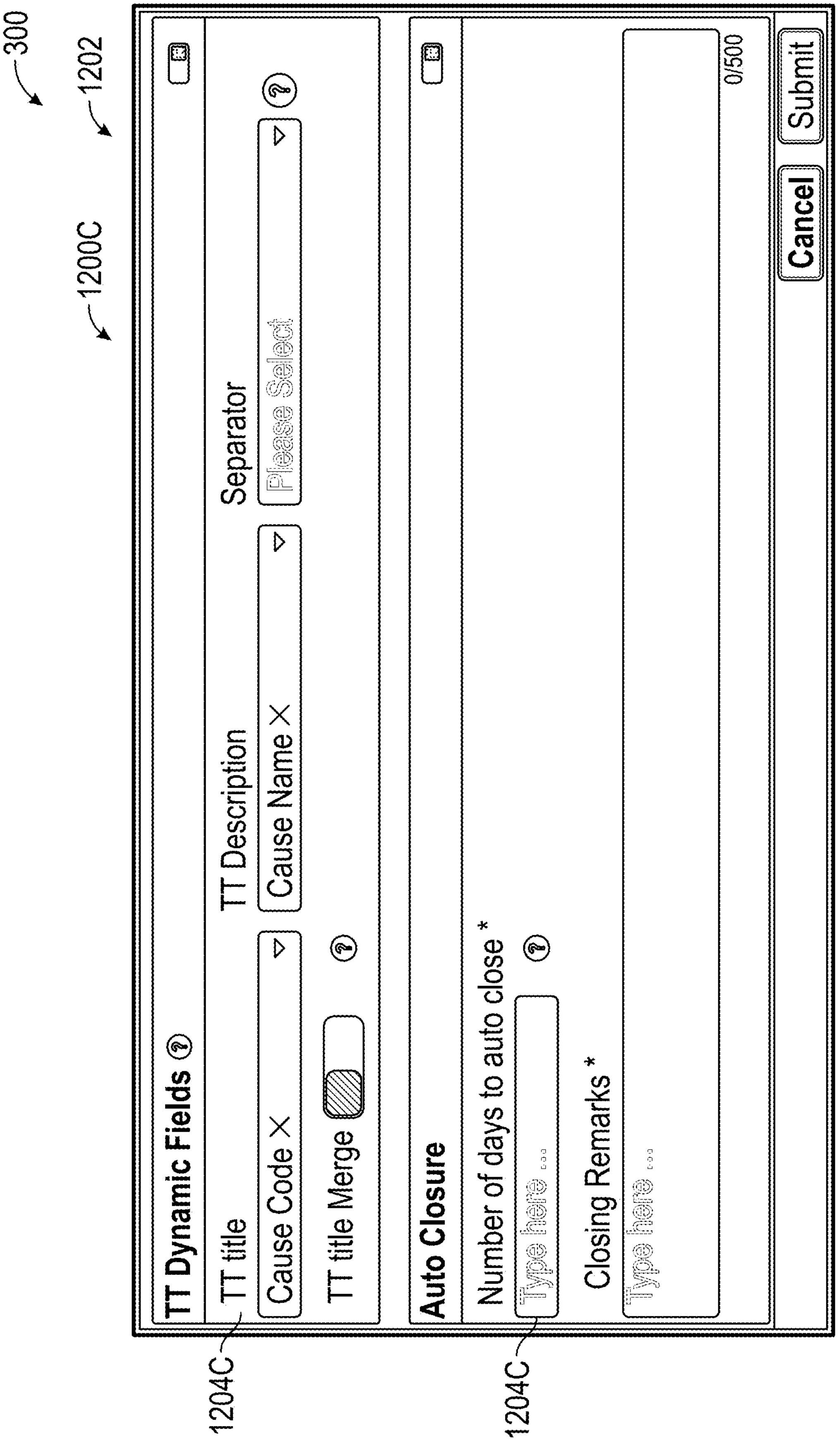

FIGS. 12A-12C illustrate panels 1200A, 1200B, 1200C in the GUI 300 that visually illustrates an example of a ticket incident data structure 1202, in accordance with some embodiments.

In some examples, the ticket incident data structure 1202 is an example of a ticket incident data structure 152 in FIG. 1, in accordance with some embodiments. The ticket incident data structure 1202 is generated in accordance with the automated ticket generation rules of an incident management data structure 154 with automated incident identification characteristics matching the network incident described by a network incident data structure 156.

Panel 1200A includes a subpanel 1204A that includes data fields describing the generated ticket incident data structure 1202. Subpanel 1204A includes domain field that describes the domain of the ticket incident data structure 1202 (i.e., "Domain" in FIG. 12A), a third party identifier field that identifies a third party related to the ticket described by the ticket incident data structure 1202 (i.e., "Vendor" in FIG. 12A), a data field that describes that the ticket has been generated as a result of the selection of a cause code as shown in FIG. 8 (i.e., "Auto TT Design" in FIG. 12A), a data field that describes the cause code (i.e., "Cause Code" in FIG. 12A), an incident status field that describes a status of the incident related to the ticket incident data structure 1202 (i.e., "Incident Status" in FIG. 12A), a delay field that indicates an amount of time for a delay, and an equipment status field that indicates the status of the ticket incident data structure 1202 (i.e., "Equipment ID Status" in FIG. 12A).

Panel 1200A includes a subpanel 1206A that includes data fields with information related to the ticket incident data structure 1202. Subpanel 1206A includes title field that indicates the title of the ticket incident data structure 1202 (i.e., "TT Title" in FIG. 12A), a ticket family field that identifies whether the ticket incident data structure 1202 is in a family of ticket incident data structure 152 and that identifies the family when there is one (i.e., "Ticket Family" in FIG. 12A), an impact field that describes that an impact that corrective measures for the ticket incident data structure 1202 (i.e., "Impact" in FIG. 12A), a domain field that identifies the domain related to the ticket incident data structure 1202 (i.e., "Domain" in FIG. 12A), Domain field 1204A denotes and incident domain field while domain field 1206A denotes a ticket domain field. In some embodiments, the solution is a pluggable solution with other ticket service providers which have different set of domains and vendors. an subdomain field that describes a subdomain related to the ticket incident data structure 1202 (i.e., "Sub Domain" in FIG. 12A), a category field that indicates a category related to the ticket incident data structure 1202 (i.e., "Category" in FIG. 12A), a subcategory field that indicates a subcategory related to the ticket incident data structure 1202 (i.e., "Sub Category" in FIG. 12A), a work template field that identifies a work template used to approve and/or take corrective actions related to the ticket incident data structure 1202 (i.e., "Work Flow Template" in FIG. 12A), a urgency field that indicates an urgency of the ticket incident data structure 1202 (i.e., "Urgency" in FIG. 12A), a priority field that indicates a priority related to the ticket incident data structure 1202 (i.e., "Priority" in FIG. 12A), a data field that indicates type of ticket described by the ticket incident data structure 1202 (i.e., "Type of Ticket" in FIG. 12A), a description field described the subject matter of the ticket incident data structure 1202 (i.e., "Description" in FIG. 12A), and a label field that identifies labels related to the ticket incident data structure 1202 (i.e., "Labels" in FIG. 12A).

Panel 1200B in FIG. 12B includes subpanels 1204B, 1206B, 1208B. Subpanel 1204B in FIG. 12B includes a selection bar to receive a user selection that indicates other ticket incident data structures 152 that the ticket incident data structure 1202 to which it relates and a search bar to receive user text so that a user can search for other ticket incident data structures 152 that the ticket incident data structure 1202 is to which it relates (i.e., "Related to" in FIG. 12B).

Subpanel 1206B in FIG. 12B includes a creator field that identifies a party responsible for the ticket incident data structure 1202 (i.e., "Creator" in FIG. 12B) and an assignee and watchers field that identifies assignees and watchers associated with the ticket incident data structure 1202 (i.e., "Assignee & Watchers" in FIG. 12B).

Subpanel 1208B includes a search bar for receiving user text where a user searches for workgroups to associate with the ticket incident data structure 1202 (i.e., "Notifications" in FIG. 12B).

Subpanel 1210B in FIG. 12B includes options related to merging the ticket incident data structure 1202 with one or more other ticket incident data structures 1202 (i.e., "Default Merging, Custom Merging, Do not Merge" in FIG. 12B). A text box is included for receiving user text related to a custom merge (i.e., "Custom Merging" in FIG. 12B). A selection slide bar is included when a user wants to indicate that the ticket incident data structure 1202 is to merge with a ticket incident data structure 152 that has already been resolved (i.e., "Incident Merging into Resolved to Reopen Ticket" in FIG. 12B).

Panel 1200C in FIG. 12C includes subpanels 1204C and subpanels 1206C. The dynamic filed is an option provided while configuring auto ticket rules to change the value based on incident details instead of using field values defined by user. In some embodiments, in response to details being missing for and incident, then user provided details are displayed.

Subpanel 1206C includes a text box to enter a number related to a number of days until the ticket described by the ticket incident data structure 1202 is closed (i.e., "Number of days to auto close" in FIG. 12C) and a text box to enter remarks for when the ticket described by the ticket incident data structure 1202 is closed (i.e., "Closing Remarks" in FIG. 12C).

Figure 13:
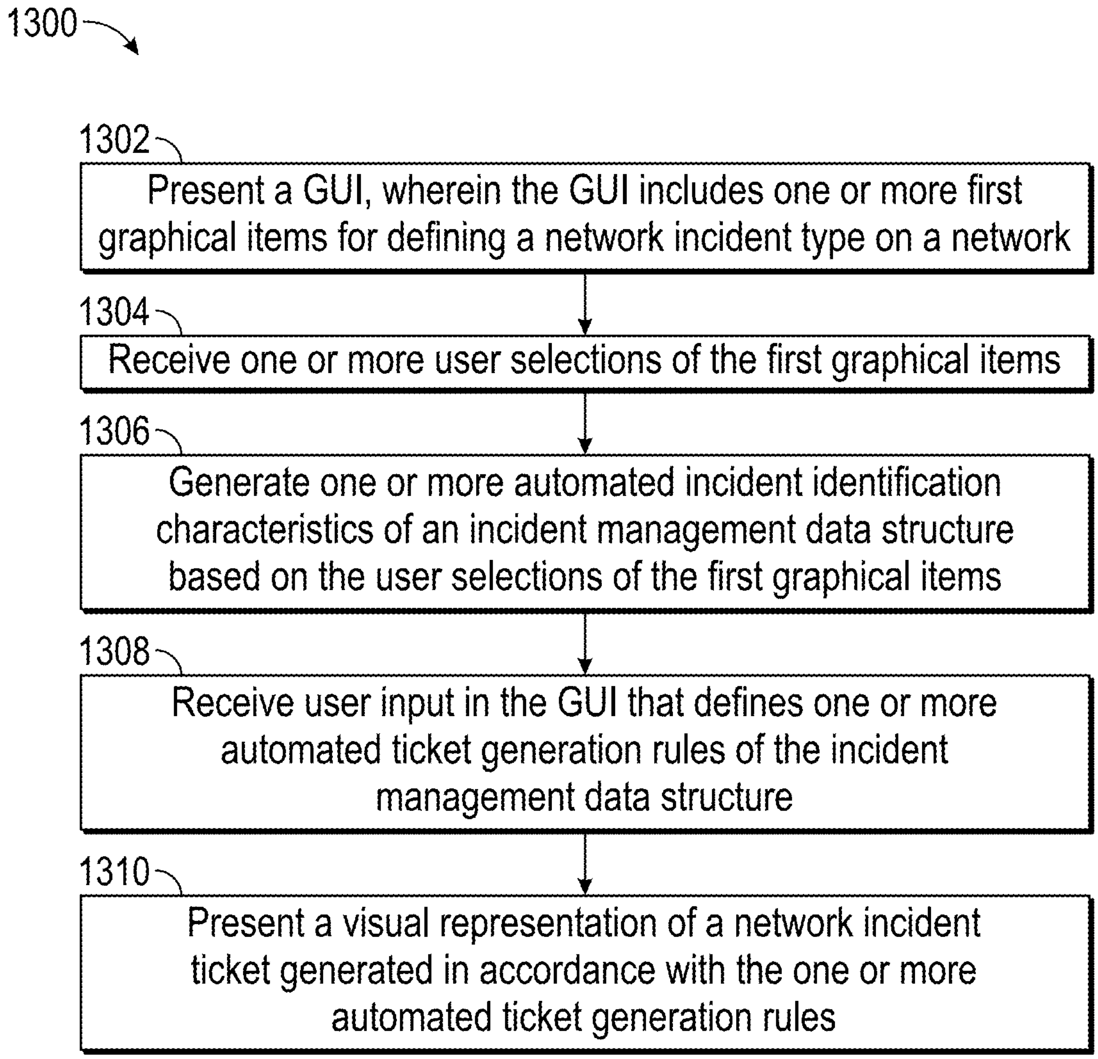
FIG. 13 is a flowchart that illustrates a method of setting rules that automate the creation of a ticket related to incidents on a computer network, in accordance with some embodiments.

FIG. 13 is a flowchart 1300 that illustrates a method of setting rules that automate the creation of a ticket related to incidents on a computer network, in accordance with some embodiments.

Flowchart 1300 is implemented by the network incident management computer software executed by the network incident management computer device 102, in accordance with some embodiments. Flowchart 1300 includes blocks 1302-1310. Flow begins at block 1302.

At block 1302, a GUI is presented, wherein the GUI includes one or more graphical items for defining a network incident type on a network. An example of the graphical items in the GUI are the graphical items described shown in FIGS. 2-9 with respect to the GUI 300. An example of the network is the computer network 105 shown in FIG. 1. In some embodiment, the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item), such as in FIGS. 5-9. Flow then proceeds to block 1304.

At block 1304, one or more user selections are received for the one or more graphical items. An example of the user selections are user selection received with respect to the graphical items described shown in FIGS. 2-9 with respect to the GUI 300. Flow then proceeds to block 1306. In some embodiments, receiving one of the user selections that indicates one of the domains for the network incident type, such as in FIG. 3. In some embodiments, receiving one of the user selections that indicates one of the vendors for the network incident type, such as in FIG. 4. In some embodiments, receiving one of the user selections that indicates either the geographical graphical item, the correlation type graphical item, the category graphical item, and the cause code graphical item, such as in FIGS. 1-9. Flow then proceeds to block 1306.

At block 1306, one or more automated incident identification characteristics of an incident management data structure are generated based on the user selections of the first graphical items. Examples of the incident management data structure include the incident management data structure(s) 154 in FIG. 1 and the network incident data structure 1002 described with respect to FIGS. 10-11C. The automated incident identification characteristics of the network incident management structure were selected in FIG. 2-FIG. 9. Flow then proceeds to block 1308.

At 1308, user input is received in the GUI that defines one or more automated ticket generation rules. In some embodiments, the automated ticket generation rules are a script. In some embodiments, the automated ticket generation rules through another type of algorithm. An example of the characteristics of the automated ticket generation rules are described in FIGS. 11A-11C. In some embodiments, a panel in the GUI, such as the panel 1100A in FIG. 11A. In some embodiments, the user input is received as an algorithm that defines the one or more automated ticket generation rules, such as in subpanel 1104A in FIG. 11A. Flow then proceeds to block 1310.

At 1310, a visual representation the network incident management structure in the GUI.

Figure 14:
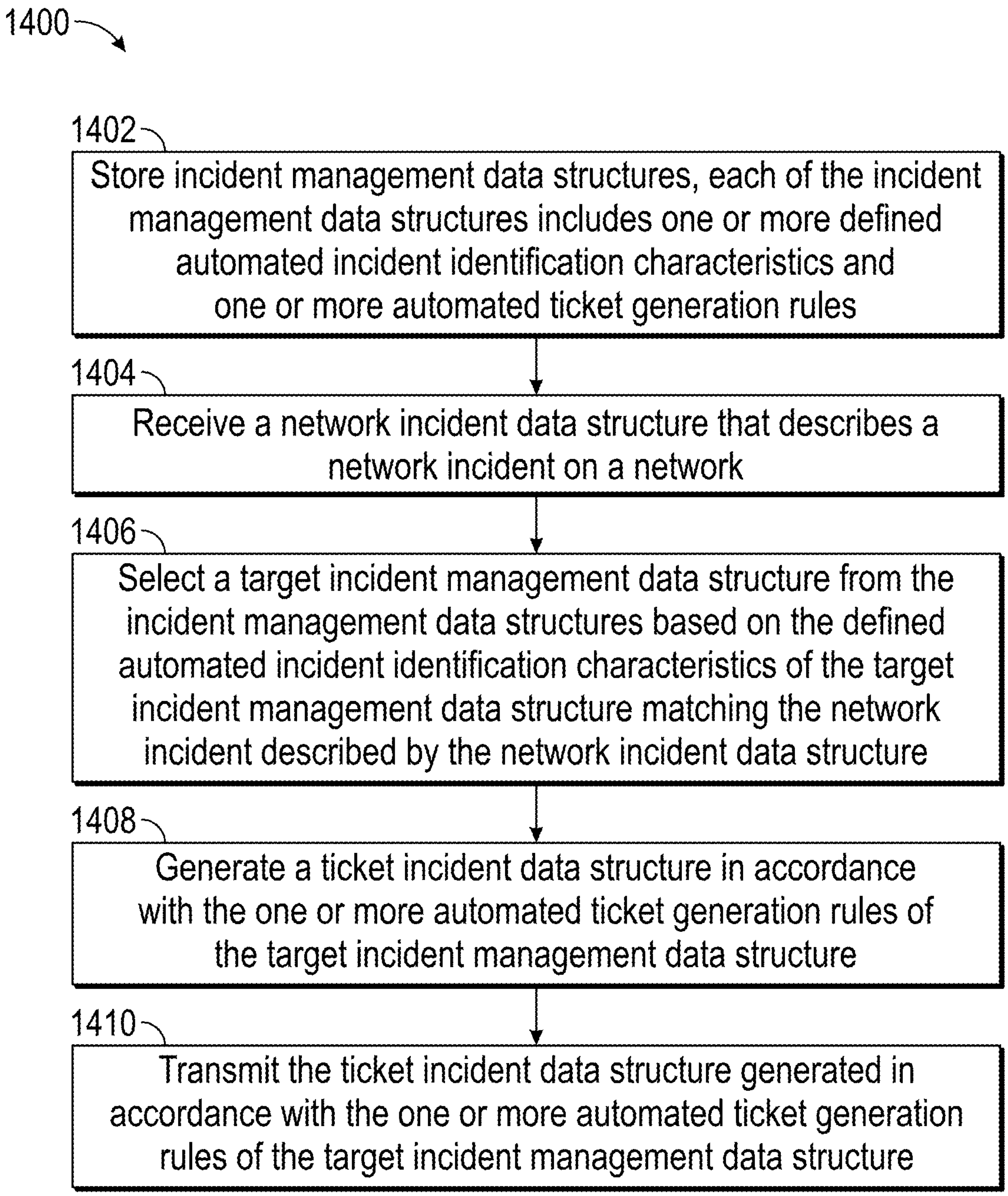
FIG. 14 is a flowchart that illustrates a method of generating a network ticket for an incident on a computer network, in accordance with some embodiments.

FIG. 14 is a flowchart 1400 that illustrates a method of generating a network ticket for an incident on a computer network, in accordance with some embodiments.

Flowchart 1300 is implemented by the network incident management computer software executed by the network incident management computer device 102, in accordance with some embodiments. Flowchart 1400 includes block 1402-1410. Flow begins a block 1402.

At block 1400, incident management data structures are stored, each of the incident management data structures including one or more defined automated incident identification characteristics. Examples of the incident management data structure include the incident management data structure(s) 154 in FIG. 1 and the network incident data structure 1002 described with respect to FIGS. 10-11C. The automated incident identification characteristics of the network incident management structure were selected in FIG. 2-FIG. 9. In some embodiments, the automated ticket generation rules are a script. In some embodiments, the automated ticket generation rules through another type of algorithm. An example of the characteristics of the automated ticket generation rules are described in FIGS. 11A-11C. Flow then proceeds to block 1404.

At block 1404, a network incident data structure is received that describes a network incident on a network. Examples of the network include the computer network 105, in FIG. 1. Examples of the network incident data structure include the network incident data structure 156 in FIG. 1 and the network incident data structure 1002 in FIG. 10. Flow then proceeds to block 1406.

At block 1406, a target incident management data structure is selected from the incident management data structures based on the defined automated incident identification characteristics of the target incident management data structure matching the network incident described by the network incident data structure. Flow then proceeds to block 1408.

At block 1408, a ticket incident data structure is generated in accordance with the one or more automated ticket generation rules of the target incident management data structure. Examples of the ticket incident data structure are the ticket incident data structure 152 in FIG. 1 and the ticket incident data structure 1202 shown in FIG. 12A-12C. Flow then proceeds to block 1410.

At block 1410, the ticket incident data structure is transmitted in accordance with the one or more automated ticket generation rules of the target incident management data structure.

Figure 15:
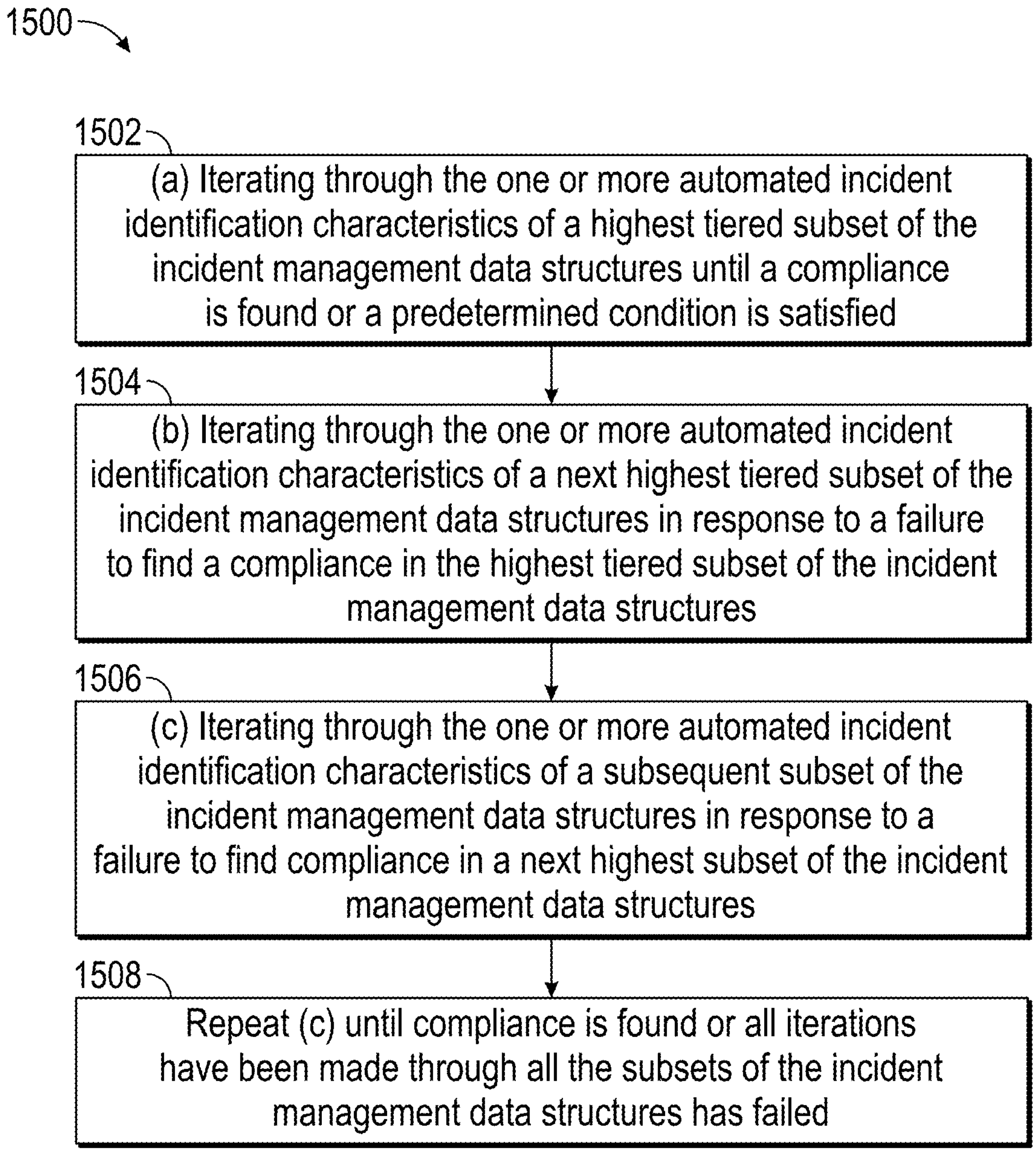
FIG. 15 is flowchart illustrating a method of selecting a target incident management structure from the incident management data structures, in accordance with some embodiments.

FIG. 15 is flowchart 1500 illustrating a method of selecting a target incident management structure from the incident management data structures, in accordance with some embodiments.

Flowchart 1500 is implemented by the network incident management computer software executed by the network incident management computer device 102, in accordance with some embodiments. In some embodiments, the incident management data structures includes different subsets of incident management data structures such that the subsets of incident management data structures are ordered in tiers, as shown in FIG. 2. In some embodiments, the highest tiered subset of incident management data structures includes a subset of geography based incident management data structures, the next highest tier subset of incident management data structures includes a subset of correlation type incident management data structures, the subsequent highest tier subset of incident management data structures includes a subset of a category type incident management data structures, and a lowest tier subset of incident management data structures comprises a subset of cause code incident management data structures. In some embodiments, flowchart 1500 is an example of block 1406 in FIG. 14 when the incident management data structures are order in tiers, such as in FIG. 2. Flowchart 1500 includes block 1502-1508. Flow begins a block 1502.

At block 1502, the one or more automated incident identification characteristics of a highest tiered subset of the incident management data structures are iterated through until a compliance is found or a predetermined condition is satisfied. Flow then proceeds to block 1504.

At block 1504, the one or more automated incident identification characteristics of a next highest tiered subset of the incident management data structures are iterated through in response to a failure to find a compliance in the highest tiered subset of the incident management data structures. Flow then proceeds at block 1506.

At block 1506, the one or more automated incident identification characteristics of a subsequent subset of the incident management data structures in response to a failure to find compliance in a next highest subset of the incident management data structures. Flow then proceeds at block 1508.

At block 1508, block 1506 is repeated until compliance is found or all iterations have been made through all the subsets of the incident management data structures has failed.

In some embodiments, a method of setting rules that automate the creation of a ticket related to incidents on a computer network, includes: presenting a graphical user interface (GUI), wherein the GUI includes one or more first graphical items for defining a network incident type on a network; receiving one or more user selections of the one or more first graphical items; generating one or more automated incident identification characteristics of an incident management data structure based on the user selections of the first graphical items; and receiving user input in the GUI that defines one or more automated ticket generation rules of the incident management data structure. In some embodiments, the first graphical items include a group of graphical items that indicate domains in the network, wherein the receiving the one or more user selections of the graphical items includes: receiving one of the user selections that indicates one of the domains for the network incident type. In some embodiments, the first graphical items include a group of graphical items that indicate vendors that service the network, wherein the receiving the one or more user selections of the graphical items includes: receiving one of the user selections that indicates one of the vendors for the network incident type. In some embodiments, the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item): receiving one of the user selections that indicates either the geographical graphical item, the correlation type graphical item, the category graphical item, and the cause code graphical item. In some embodiments, the receiving the user input in the GUI that defines the one or more automated ticket generation rules of the incident management data structure, includes: presenting a panel in the GUI; receiving the user input as an algorithm that defines the one or more automated ticket generation rules. In some embodiments, the user input that define the algorithm is a script. In some embodiments, the method further includes: presenting a visual representation of the incident management data structure in the GUI.

In some embodiments, a computer device of setting rules that automate the creation of a ticket related to incidents on a computer network, includes: a non-transitory computer readable medium configured to store computer executable instructions; at least one processor, wherein in response to executing the computer executable instructions, the processor is configured to: present a graphical user interface (GUI), wherein the GUI includes one or more first graphical items for defining a network incident type on a network; receive one or more user selections of the one or more first graphical items; generate one or more automated incident identification characteristics of an incident management data structure based on the user selections of the first graphical items; and receive user input in the GUI that defines one or more automated ticket generation rules of the incident management data structure. In some embodiments, the first graphical items include a group of graphical items that indicate domains in the network, wherein the receiving the one or more user selections of the graphical items includes: receiving one of the user selections that indicates one of the domains for the network incident type. In some embodiments, the first graphical items include a group of graphical items that indicate vendors that service the network, wherein the receiving the one or more user selections of the graphical items includes: receiving one of the user selections that indicates one of the vendors for the network incident type. In some embodiments, the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item): the processor is further configured to receive one of the user selections that indicates either the geographical graphical item, the correlation type graphical item, the category graphical item, and the cause code graphical item. In some embodiments, the processor is further configured to the receive the user input in the GUI that defines the one or more automated ticket generation rules of the incident management data structure by: presenting a panel in the GUI; receiving the user input as an algorithm that defines the one or more automated ticket generation rules. In some embodiments, the user input that defines the algorithm is a script. In some embodiments, the processor is further configured to: presenting a visual representation of the incident management data structure in the GUI.

In some embodiments, a non-transitory computer readable medium configured to store computer executable instructions, wherein in response to executing the computer executable instructions, a processor is configured to: present a graphical user interface (GUI), wherein the GUI includes one or more first graphical items for defining a network incident type on a network; receive one or more user selections of the one or more first graphical items; generate one or more automated incident identification characteristics of an incident management data structure based on the user selections of the first graphical items; and receive user input in the GUI that defines one or more automated ticket generation rules of the incident management data structure. In some embodiments, the first graphical items include a group of graphical items that indicate domains in the network, wherein the receiving the one or more user selections of the graphical items includes: receiving one of the user selections that indicates one of the domains for the network incident type. In some embodiments, the first graphical items include a group of graphical items that indicate vendors that service the network, wherein the receiving the one or more user selections of the graphical items includes: receiving one of the user selections that indicates one of the vendors for the network incident type. In some embodiments, the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item): the processor is further configured to receive one of the user selections that indicates either the geographical graphical item, the correlation type graphical item, the category graphical item, and the cause code graphical item. In some embodiments, the processor is further configured to the receive the user input in the GUI that defines the one or more automated ticket generation rules of the incident management data structure by: presenting a panel in the GUI; receiving the user input as an algorithm that defines the one or more automated ticket generation rules. In some embodiments, the user input that defines the algorithm is a script.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A method of setting rules for automating creation of a ticket related to incidents on a computer network, comprising:

generating a graphical user interface (GUI);

presenting, on a display of a computer device, wherein the GUI includes one or more first graphical items for defining a network incident type on a network;

receiving, using the GUI presented on the display, one or more user selections of the one or more first graphical items;

generating one or more automated incident identification characteristics of an incident management data structure based on the one or more user selections;

receiving a user input using the GUI, wherein the user input defines one or more automated ticket generation rules of the incident management data structure;

detecting a network incident on the computer network;

generating a network incident data structure that describes the network incident on the computer network in response to detecting the network incidents;

retrieving network incident data associated with a performance of the computer network from the network incident data structure in a database;

automatically comparing the retrieved network incident data to each of the one or more automated ticket generation rules to identify any of the one or more automated ticket generation rules matching the retrieved network incident data;

automatically generating a ticket incident data structure describing the network incident in response to the retrieved network incident data matching any of the one or more automated ticket generation rules; and transmitting the ticket incident data structure over the network to one or more user devices for displaying on the one or more user devices a ticket corresponding to the network incident.

2. The method of claim 1, wherein the first graphical items include a group of graphical items that indicate domains in the network, wherein the receiving the one or more user selections of the graphical items includes:

receiving one of the user selections that indicates one of the domains for the network incident type.

3. The method of claim 1, wherein the first graphical items include a group of graphical items that indicate vendors that service the network, wherein the receiving the one or more user selections of the graphical items includes:

receiving one of the user selections that indicates one of the vendors for the network incident type.

4. The method of claim 1, wherein the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item):

receiving one of the user selections that indicates either the geographical graphical item, the correlation type graphical item, the category graphical item, and the cause code graphical item.

5. The method of claim 1, wherein the receiving the user input in the GUI that defines the one or more automated ticket generation rules of the incident management data structure, comprises:

presenting a panel in the GUI;

receiving the user input as an algorithm that defines the one or more automated ticket generation rules.

6. The method of claim 1, further comprising automatically transmitting to a user device an algorithm associated with the network incident for administering the automatically generated ticket to correct the network incident.

7. The method of claim 1, further comprising:

presenting a visual representation of the incident management data structure in the GUI.

8. A computer device of setting rules that automate the creation of a ticket related to incidents on a computer network, configured to:

generate a graphical user interface (GUI);

present the GUI on a display device, wherein the GUI includes one or more first graphical items for defining a network incident type on a network;

receive, using the GUI presented on the display, one or more user selections of the one or more first graphical items;

generate one or more automated incident identification characteristics of an incident management data structure based on the one or more user selections;

receive a user input using the GUI, wherein the user input that defines one or more automated ticket generation rules of the incident management data structure;

detect a network incident on the computer network;

generate a network incident data structure that describes the network incident on the computer network in response to detecting the network incidents;

retrieve network incident data associated with a performance of the computer network from the network incident data structure in a database;

automatically compare the retrieved network incident data to each of the one or more automated ticket generation rules to identify any of the one or more automated ticket generation rules matching the retrieved network incident data;

automatically generate a ticket incident data structure describing the network incident in response to the retrieved network incident data matching any of the one or more automated ticket generation rules; and transmit the ticket incident data structure over the network to one or more user devices for displaying on the one or more user devices a ticket corresponding the network incident.

9. The computer device of claim 8, wherein the first graphical items include a group of graphical items that indicate domains in the network, wherein the receiving the one or more user selections of the graphical items includes:

receiving one of the user selections that indicates one of the domains for the network incident type.

10. The computer device of claim 8, wherein the first graphical items include a group of graphical items that indicate vendors that service the network, wherein the receiving the one or more user selections of the graphical items includes:

receiving one of the user selections that indicates one of the vendors for the network incident type.

11. The computer device of claim 8, wherein the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item):

the computer device being further configured to receive one of the user selections that indicates either the geographical graphical item, the correlation type graphical item, the category graphical item, and the cause code graphical item.

12. The computer device of claim 8, further configured to the receive the user input in the GUI that defines the one or more automated ticket generation rules of the incident management data structure by:

presenting a panel in the GUI;

receiving the user input as an algorithm that defines the one or more automated ticket generation rules.

13. The computer device of claim 8, further configured to automatically transmits to a user device an algorithm associated with the network incident for administering the automatically generated ticket to correct the network incident.

14. The computer device of claim 8, further configured to:

presenting a visual representation of the incident management data structure in the GUI.

15. A non-transitory computer readable medium configured to store computer executable instructions, wherein the computer executable instructions are executed to perform operations to:

generate a graphical user interface (GUI);

present, on a display of a computer device, wherein the GUI includes one or more first graphical items for defining a network incident type on a network;

receive, using the GUI presented on the display, one or more user selections of the one or more first graphical items;

generate one or more automated incident identification characteristics of an incident management data structure based on the one or more user selections of the first graphical items;

receive user input using the GUI, wherein the user input defines one or more automated ticket generation rules of the incident management data structure;

detect a network incident on the computer network;

generate a network incident data structure that describes the network incident on the computer network in response to detecting the network incidents;

retrieve network incident data associated with a performance of the computer network from the network incident data structure in a database;

automatically compare the retrieved network incident data to each of the one or more automated ticket generation rules to identify any of the one or more automated ticket generation rules matching the retrieved network incident data;

automatically generate a ticket incident data structure describing the network incident in response to the retrieved network incident data matching any of the one or more automated ticket generation rules; and transmit the ticket incident data structure over the network to one or more user devices for displaying on the one or more user devices a ticket corresponding to the network incident.

16. The non-transitory computer readable medium of claim 15, wherein the first graphical items include a group of graphical items that indicate domains in the network, wherein the receiving the one or more user selections of the graphical items includes:

receiving one of the user selections that indicates one of the domains for the network incident type.

17. The non-transitory computer readable medium of claim 15, wherein the first graphical items include a group of graphical items that indicate vendors that service the network, wherein the receiving the one or more user selections of the graphical items includes:

receiving one of the user selections that indicates one of the vendors for the network incident type.

18. The non-transitory computer readable medium of claim 15, wherein the first graphical items include a graphical item for selecting a geography of the network incident type (geographical graphical item), a graphical item for selecting a correlation type of the network incident type (correlation type graphical item), a graphical item for selecting a category of the network incident type (category graphical item), and a graphical item for selecting a cause code of the network incident type (cause code graphical item):

the non-transitory computer readable medium is further configured to receive one of the user selections that indicates either the geographical graphical item, the correlation type graphical item, the category graphical item, and the cause code graphical item.

19. The non-transitory computer readable medium of claim 15, further configured to the receive the user input in the GUI that defines the one or more automated ticket generation rules of the incident management data structure by:

presenting a panel in the GUI;

receiving the user input as an algorithm that defines the one or more automated ticket generation rules.

20. The non-transitory computer readable medium of claim 15, further configured to automatically transmits to a user device an algorithm associated with the network incident for administering the automatically generated ticket to correct the network incident.

* * * * *